(12) United States Patent
Nakaya et al.

(10) Patent No.: US 7,703,851 B2
(45) Date of Patent: Apr. 27, 2010

(54) SEAT DEVICE

(75) Inventors: Kouichi Nakaya, Hiroshima (JP); Kousei Nakano, Hiroshima (JP)

(73) Assignee: Mazda Motor Corporation (JP)

( * ) Notice: Subject to any disclaimer, the term of this patent is extended or adjusted under 35 U.S.C. 154(b) by 259 days.

(21) Appl. No.: 11/892,829

(22) Filed: Aug. 28, 2007

(65) Prior Publication Data
US 2008/0073960 A1 Mar. 27, 2008

(30) Foreign Application Priority Data
Sep. 21, 2006 (JP) .............................. 2006-255654
Sep. 21, 2006 (JP) .............................. 2006-255656
Sep. 21, 2006 (JP) .............................. 2006-255660

(51) Int. Cl.
*A47C 1/00* (2006.01)
(52) U.S. Cl. ................ 297/344.15; 297/342; 297/378.1
(58) Field of Classification Search ............ 297/344.15, 297/284.11, 378.1, 316, 319, 342
See application file for complete search history.

(56) References Cited

U.S. PATENT DOCUMENTS 4,636,002 A * 1/1987 Genjiro ...................... 297/319
4,796,952 A * 1/1989 Piretti ...................... 297/300.5
6,109,693 A * 8/2000 Bauer et al. ............. 297/284.11
7,090,296 B2 * 8/2006 Massimo ...................... 297/319
7,367,625 B2 * 5/2008 Mori et al. .............. 297/378.12

FOREIGN PATENT DOCUMENTS

JP 62-192114 8/1987
JP 06-245837 9/1994

* cited by examiner

*Primary Examiner*—Sarah B McPartlin
(74) *Attorney, Agent, or Firm*—Studebaker & Brackett PC; Donald R. Studebaker

(57) ABSTRACT

A tilt mechanism portion is connected to an front downward-extending portion of a side frame (cushion side fame) of a seat cushion so as to move vertically the seat cushion. A rear downward-extending portion of the cushion side frame is supported at a support pin of a base side frame. Thereby, the rear end of the seat cushion changes little longitudinally despite the vertical movement (tilt) of the front portion of the seat cushion. Accordingly, any conformability deterioration that may be caused by a large forward movement of the seat cushion at a seat back taking a large reclining position can be prevented properly.

15 Claims, 14 Drawing Sheets

FIG. 4A
FIG. 4B
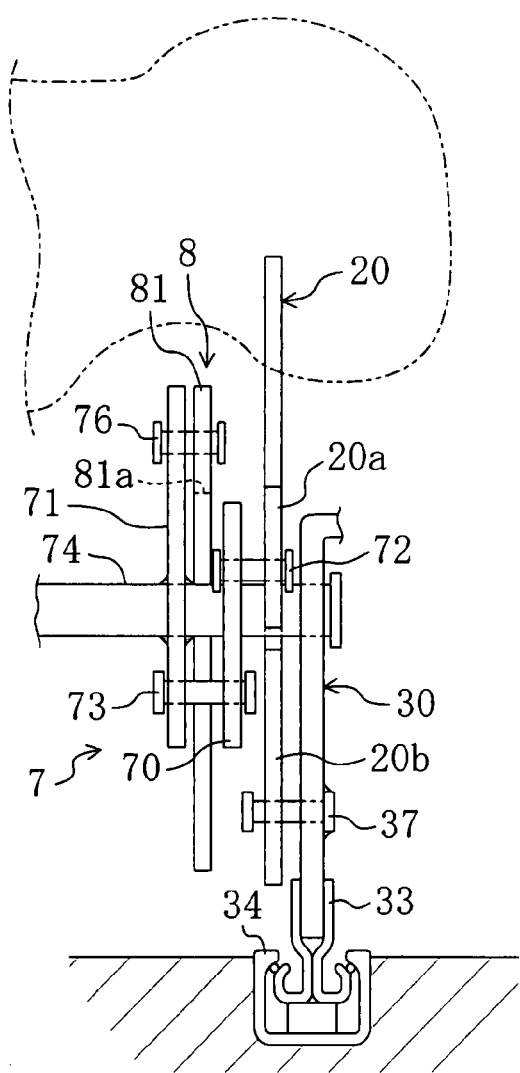
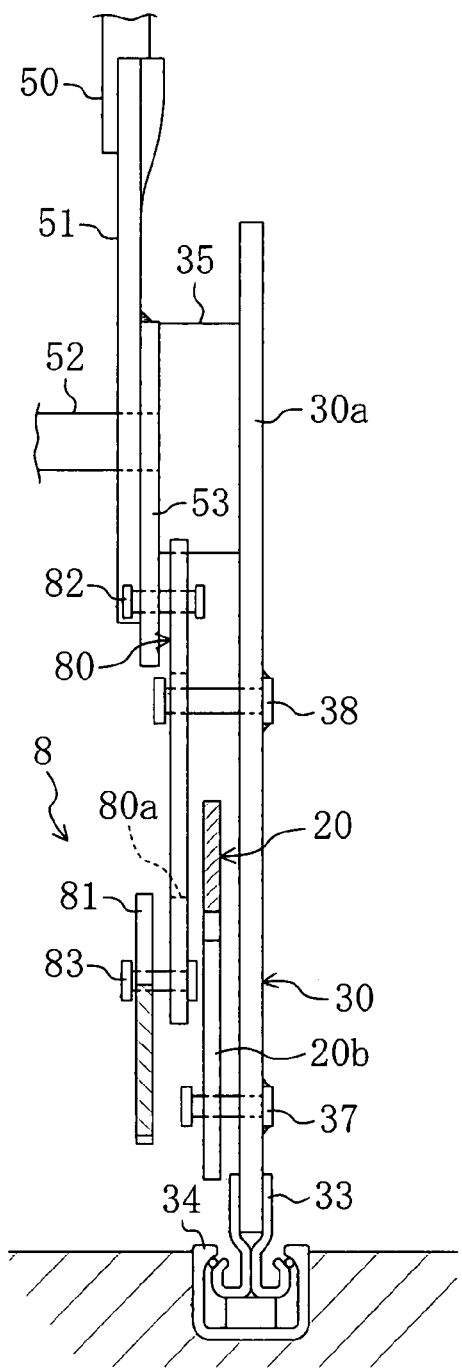

SEAT DEVICE

BACKGROUND OF THE INVENTION

The present invention relates to a seat device in which an inclination of a seat face can change in accordance with a rearward rotation of a seat back.

A seat device for an automotive vehicle, for example, in which the seat cushion is moved when the seat back is rotated rearward (reclining) from its specified standard position corresponding to a normal seat position in such a manner that the inclination of the seat face of the seat cushion changes, is known (see Japanese Patent Laid-Open Publications 62-192114, 06-245837, for example). Herein, in general, the rotational movement of the seat back is mechanically conveyed to the seat cushion, thereby moving the seat cushion (tilting, swinging). Thus, the inclination of the seat face is changed so as to prevent the buttocks of the passenger seated from sliding forward improperly on the seat face.

Herein, the above-described conventional seat device has the following problem. The seat cushion is moved in accordance with the relining-of the seat back in such a manner that the front portion of the seat cushion moves obliquely upward and forward, so that the forward movement may become considerably large. Hence, in a case where the seat back is rotated rearward greatly (taking a large reclining position), a large gap may be generated between the lower end of the seat back and the rear end of the seat cushion, so there is a concern that part of the buttocks of the passenger would be caught in this gap and thereby the conformability of the passenger seated would deteriorate.

SUMMARY OF THE INVENTION

The present invention has been devised in view of the above-described problem, and an object of the present invention is to provide a seat device that can properly prevent such conformability deterioration when the seat back takes the large reclining position.

According to the present invention, there is provided a seat device, comprising a rotational mechanism portion to enable a seat back to at least rotate rearward around a lower end thereof from a specified standard position thereof, a tilt mechanism portion to enable a front portion of a seat cushion to at least move substantially vertically, and a linkage mechanism portion to make the tilt mechanism portion move the front portion of the seat cushion substantially vertically in accordance with a rotation of the seat back enabled by the rotational mechanism portion, wherein the tilt mechanism portion is configured such that a vertical moving distance of the front portion of the seat cushion is greater than a longitudinal moving distance thereof when the front portion of the seat cushion moves between a lowermost position and an uppermost position thereof.

According to the above-described seat device, when the seat back is rotated rearward from the specified standard position, the tilt mechanism portion is moved by the linkage mechanism portion in accordance with the rotation of the seat back, and thereby the front portion of the seat cushion moves at least vertically to change the inclination of the seat face. Accordingly, the rearward inclination of the seat face can be increased properly in accordance with the rearward rotation of the seat back like the conventional device, so performances of supporting, holding can be improved preventing the buttocks of the passenger seated from sliding forward improperly on the seat face.

Herein, the longitudinal moving distance of the front portion of the seat cushion is smaller than its vertical moving distance when the front portion of the seat cushion moves to its uppermost position thereof in accordance with the large reclining of the seat back. Namely, the seat cushion does not move forward too much, so the gap generated between the rear end of the seat cushion and the lower end of the seat back taking its large reclining position does not become improperly large. Thus, part of the buttocks of the passenger can be properly prevented from being caught in this gap.

According to an embodiment of the present invention, the linkage mechanism portion comprises at least one link that moves substantially longitudinally in accordance with the rotation of the seat back, and the tilt mechanism portion comprises a rotating lever that is attached at a portion on a fixed side so as to rotate around a rotational axis extending substantially laterally, one end of the rotating lever being rotatably coupled to a member on a side of the seat cushion, the other end of the rotating lever being rotatably coupled to a front end of the one link of the linkage mechanism portion. Thereby, when the link of the linkage mechanism portion moves longitudinally in accordance with the rotation of the seat back, the other end of the rotating lever coupled to the front end of the link moves longitudinally as well. Thus, the rotating lever rotates around the rotational axis, so the one end of the rotating lever moves vertically. And the front end of the seat cushion moves vertically via the member coupled to the one end of the rotating lever. Namely, the longitudinal movement of the link of the linkage mechanism portion can be efficiently changed to the vertical movement by the rotating lever, so the vertical moving distance of the front portion of the seat cushion can be made properly large with the compact structure.

According to another embodiment of the present invention, a rear portion of the seat cushion is attached at a portion on a fixed side so as to rotate around an axis extending substantially laterally. Thereby, there happens little longitudinal movement of the rear end of the seat cushion despite the vertical movement of the front end, so the above-described gap can be surely prevented from becoming improperly large. Herein, the portion on the fixed side described above means a portion that does not move regardless of the rotation of the seat back or the tilt movement of the seat cushion. For example, this portion may be fixedly provided at a vehicle floor or at a base frame that is movably-supported at this vehicle floor.

According to another embodiment of the present invention, the one-end of the rotating lever is located in front of the rotational axis. Thereby, the acting point of a force acting from the one end to the seat cushion can be positioned forward sufficiently away from the rear rotational axis, so the front portion of the seat cushion can be moved vertically by a relatively small force.

According to another embodiment of the present invention, the one end of the rotating lever is connected to the front portion of the seat cushion via at least one link. Thereby, the acting point of the force to the seat cushion can be positioned further forward by the link, so the front portion of the seat cushion can be moved vertically by the smaller force.

According to another embodiment of the present invention, the other end of the rotating lever is located above the rotational axis, and the linkage mechanism portion is configured in such a manner that the other end of the rotating lever is pulled rearward in accordance with the rearward rotation of the seat back. Thereby, the other end of the rotating lever located above the rotational axis moves rearward greatly away from the rotational axis when the seat back is rotated rearward greatly, so any interference between the both can be properly prevented and the desirably compact tilt mechanism portion can be provided.

According to another embodiment of the present invention, the rotational mechanism portion is configured to enable the seat-back to rotate forward to a position in which a back face of the seat back is located substantially horizontally, the linkage mechanism portion comprises at least one link that moves either forward or rearward in accordance with a forward rotation of the seat back, and the tilt mechanism portion is configured such that the front portion of the seat Cushion lowers in accordance with the movement of the link. Thereby, the front portion of the seat cushion is moved downward by the tilt mechanism portion in accordance with the longitudinal movement of the link when the seat back is rotated forward greatly via the rotational mechanism portion, so the eat face of the seat cushion can be lowered enough without interfering with the seat back, and the seat back can be rotated forward greatly so as to provide a substantially horizontal back face of the seat back.

According to another embodiment of the present invention, the link of the linkage mechanism portion is respectively connected to a portion on a side of the seat back and a portion on a side of the tilt mechanism portion via slots in such a manner that the seat cushion moved by the tilt mechanism portion rotates forward by a specified second angle while the seat back rotates forward from the specified standard position by a specified first angle, the specified second angle being smaller than the specified first angle. Thereby, the tilt angle of the seat cushion becomes small relative to the rotational angle of the seat back rotated from the specified standard position to the forward-rotated position, so flexibility of the layout of the seat cushion can be improved.

According to another embodiment of the present invention, the linkage mechanism portion comprises at least one link, and at the link is provided a slot operative to restrain conveyance of a rotational movement of the seat back to the tilt mechanism portion when the seat back is positioned within a specified rotational range. Thereby, it can be prevented that the inclination of the seat face becomes too large in accordance with the rotation of the seat back, thereby improving comfortable sitting and an operational performance of the seat with a simple and compact structure.

According to another embodiment of the present invention, the linkage mechanism portion is configured such that the conveyance of the rotational movement of the seat back to the tilt mechanism portion is restrained when the seat back is rotated rearward beyond a specified angle from the specified standard position. Thereby, it can be prevented that the inclination of the seat face becomes too large in accordance with the rearward rotation of the seat back, thereby improving comfortable sitting and the operational performance of the seat. Or, the linkage mechanism portion is configured such that the conveyance of the rotational movement of the seat back to the tilt mechanism portion is restrained at least when the seat back is rotated forward from the specified standard position. Thereby, it can be prevented that the inclination of the seat face becomes too small even if the seat back is rotated forward from the specified standard position by its own weight due to an impact caused by a vehicle frontal crash or the like, thereby preventing an occurrence of a so-called submarine phenomenon.

According to another-embodiment of the present invention, the slot is provided at at least one of a connecting portion of the link on a side of the seat back and a connecting portion of the link on a side of the tilt mechanism portion Thereby, the conveyance of the movement of the seat back to the tilt mechanism portion is restrained when the link move in the extending direction of the slot in accordance with the rotation of the seat back.

According to another embodiment of the present invention, at the connecting portion of the link on the side of the tilt mechanism portion is provided the slot to restrain the conveyance of the rotational movement of the seat back to the tilt mechanism portion when the seat back is rotated forward from the specified standard position when the seat back is positioned within a specified rotational range. Thereby, the slot is provided in the moving direction of the link according to the rotational movement, so the occurrence of the submarine phenomenon can be prevented.

According to another embodiment of the present invention, the linkage mechanism portion is configured such that the front portion of the seat cushion is located in the lowermost position by the tilt mechanism portion when the seat back is in the specified standard position, while the front portion of the seat cushion is moved upward by the tilt mechanism portion when the seat back is rotated rearward from the specified standard position, and there is provided a biasing member to bias the front portion of the seat cushion downward to the lowermost position. Herein, in a case where the conveyance of the rotational movement of the seat back to the tilt mechanism portion is restrained by proving the slot at the connecting portion of the link on the side of the tilt mechanism portion when the seat back is rotated forward from the specified standard position, there is a concern that the conveyance of the rotational movement of the seat back to the tilt mechanism portion may be restrained when the seat back returns to the specified standard position from its rearward-rotated position. However, the biasing member provided as described above can solve the above-described concern.

According to another embodiment of the present invention, the link is supported via the slot at a supporting axis provided at a portion on a fixed side on a side of the seat back in such a manner that a major movement pattern of the link is changeable from either one of a rotation thereof around the supporting axis and a slide thereof guided by the supporting axis to the other when a rotational position of the seat back changes. Thereby, since the movement of the link is limited by engagement of the slot with the supporting axis, the movement pattern of the link is changeable from either one of the rotation around the supporting axis and the slide guided by the supporting axis, and thereby the conveyance of the rotational movement of the seat back to the tilt mechanism portion can be restrained at either one of the movement patterns.

According to another embodiment of the present invention, the linkage mechanism portion comprises a first link provided on the side of the seat back and a second link provided on a side of the tilt mechanism portion, the first link is supported via the slot at the supporting axis provided at the portion on the fixed side on the side of the seat back in such a manner that the first link provides the major movement of the rotation thereof around the supporting axis when the rotational position of the seat back is located between the specified standard position and a specified position that is rearward from the specified standard position by a specified angle, while the first link provides the major movement of the slide thereof guided by the supporting axis when the seat back is rotated rearward beyond the specified position that is rearward from the specified standard position by the specified angle, the second link is coupled to the first link in such a manner that a connecting portion thereof to the tilt mechanism portion moves in accordance with the rotation of the first link, while the second link rotates around the connecting portion to the tilt mechanism portion in accordance with the slide movement of the first link. Thereby, when the rotational position of the seat back is located between the specified standard position and the above-described specified position, the first link provides the major movement of its rotation around the supporting axis and the second link moves in such a manner that its connecting portion to the tilt mechanism portion moves in accordance with the rotation of the first link. Thus, the rotational movement of the seat back is conveyed to the tilt mechanism portion. Meanwhile, when the seat back is rotated rearward beyond the specified position, the first link provides the major movement of its slide guided by the supporting axis and the second link rotates around the connecting portion to the tilt mechanism portion in accordance with the movement of the first link. Thus, the rotational movement of the seat back is not conveyed to the tilt mechanism portion.

According to another embodiment of the present invention, the linkage mechanism portion comprises at least one link, and at the link is provided a slot operative to restrain conveyance of a rotational movement of the seat back to the tilt mechanism portion when the seat back is rotated rearward beyond a specified position that is rearward from the specified standard position by a specified angle, and there is provided a resistance-force adding device to apply a resistance force to a rearward rotation of the seat back beyond the specified position. Thereby, since the slot is provided at the link so as to restrain the conveyance of the rotational movement of the seat back to the tilt mechanism portion when the seat back is rotated rearward beyond the specified position, the inclination of the seat face can be prevented from becoming too large in accordance with the rotation of the seat back, thereby improving comfortable sitting and the operational performance of the seat. Moreover, when the rotational movement of the seat back is not conveyed to the seat cushion during its rotation, the reaction force from the seat cushion does not act on the seat back, so that the resistance force against the rotation of the seat back may decrease. Herein, however, since the resistance force is applied by the resistance-force adding device, this resistance force can be prevented from decreasing quickly. Thus, the passenger may not have uncomfortable feelings.

According to another embodiment of the present invention, the linkage mechanism portion comprises at least one link, and at the link is provided a slot operative to restrain conveyance of a rotational movement of the seat back to said tilt mechanism portion when the seat back is rotated rearward beyond a specified position that is rearward from the specified standard position by a specified angle, and there is provided a drive device to rotate the seat back rearward further beyond the specified position via the rotational mechanism portion. Thereby, since the seat back is rotated rearward further beyond the specified position by the drive device, even if the resistance force against the rotation of the seat back may decrease quickly, the passenger may not perceive that and thus may not have uncomfortable feelings.

The present invention can be preferably applied to the seat device in which there is provided a stand (ottoman) on which a foot of a passenger is placed at the front portion of the seat cushion.

Other features, aspects, and advantages of the present invention will become apparent from the following description which refers to the accompanying drawings.,

BRIEF DESCRIPTION OF THE DRAWINGS

FIG. 4A is an elevation view of the seat, when viewed along an arrow a of FIG. 3 and FIG. 4B is a sectional view of the seat taken along line b-b of FIG. 3.

DETAILED DESCRIPTION OF THE INVENTION

Hereinafter, preferred embodiments of the present invention will be described referring to the accompanying drawings. The present invention should not be limited to the below-described embodiments, which just exemplify preferable specific example. It should be also understood that even though the embodiments are separately described, single features thereof may be combined to additional embodiments.

(Entire Structure of Seat Device)

Figure 1:
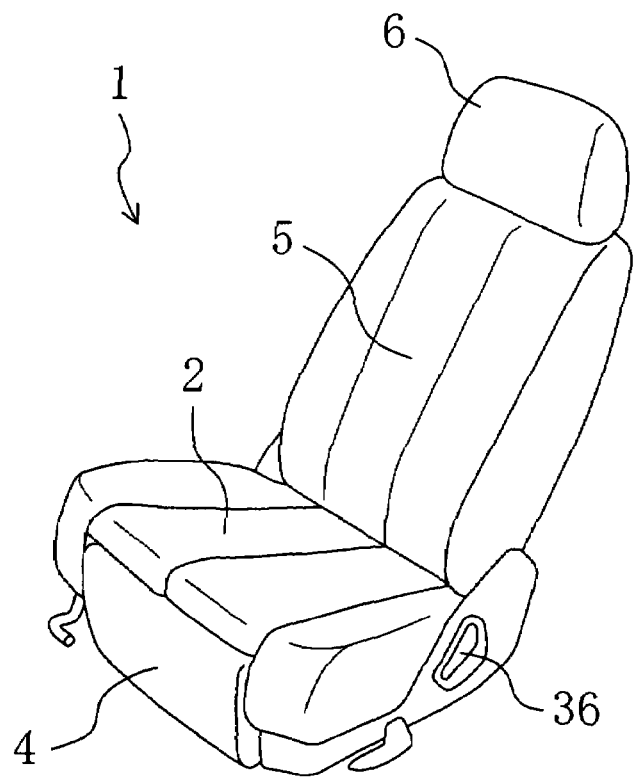
FIG. 1 is a perspective view of a seat for an automotive vehicle according to an embodiment.

FIG. 1 shows an embodiment in which a seat device according to the present invention is applied to a reclining type of seat 1 that is disposed to the left of a rear portion of an automotive vehicle. A seat cushion 2 of the seat 1, on which a passenger is seated, is attached on a vehicle floor via a base frame 3 (see FIG. 3). An ottoman 4 (a stand on which a foot is placed) is provided to be storable at a front lower portion of the seat cushion 2. A seat back 5 is provided so as to extend upward from a rear end portion of the seat cushion 2. At an upper end of the seat back 5 is provided a headrest 6.

Figure 2:
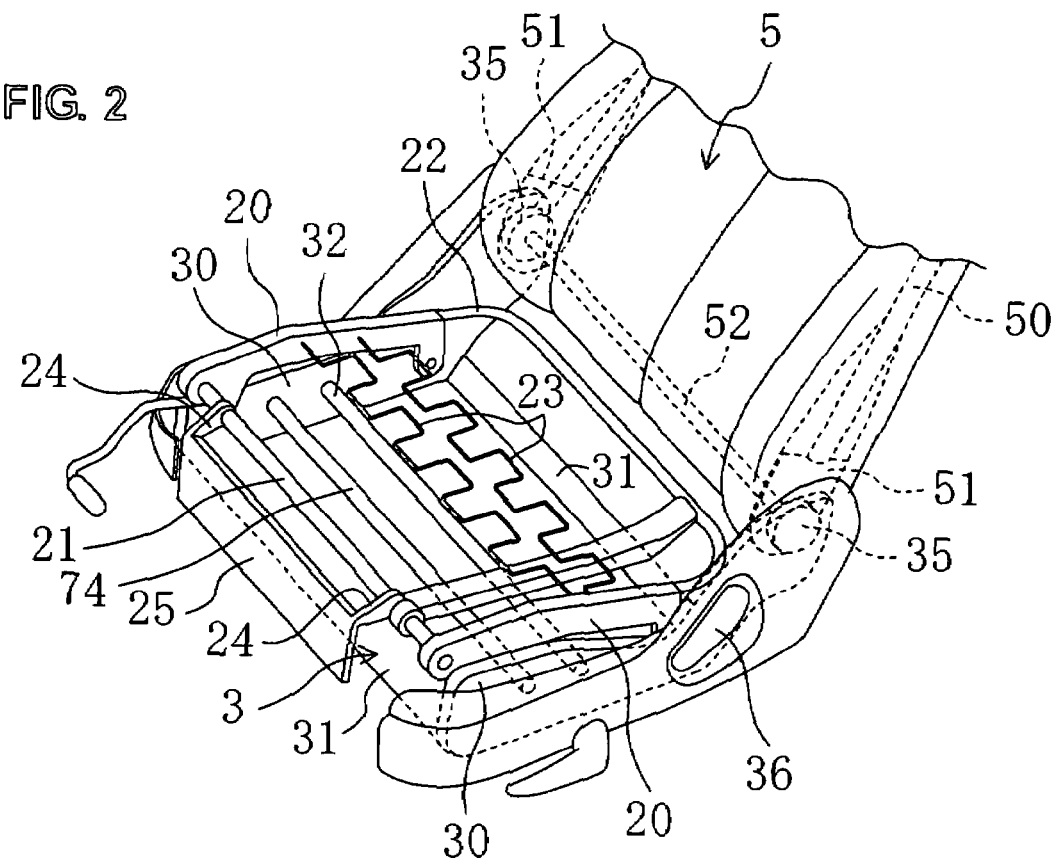
FIG. 2 is a perspective view showing a frame structure of a seat cushion omitting a cushion body.

FIG. 2 shows a frame structure of the seat cushion 2, omitting its cushion body. At both sides of the seat cushion 2 are provided side frames 20, 20 that are made of a steel-plate pressed material, for example. Their front and rear portions are coupled to reach other via pipe members 21, 22, respectively. At their middle portions are coupled to each other via wire springs 23, 23. A plate member 25 as a frame of the ottoman 4 is rotatably attached at the front pipe member 21 via arms 24, 24.

Sub frames 30, 30 of the base frame 3 are respectively disposed outside the cushion side frames 20, 20 so as to be located below and near the members 20, 20. The base sub frames 30, 30, which are made of a pressed material, are coupled to each other via connecting plates 31, 31 and a pipe member 32. To front and rear portions of the base side frames 30 are fixed sliders 33, 33, which are shown only in FIG. 4. The sliders 33, 33 are guided by slide rails 34, 34 provided on the vehicle floor so as to move longitudinally in the vehicle.

At a rear end of each base side frame 30 is provided an extending portion 30a to extend upward in a curved shape. Each lower end portion of a frame 50 of the seat backs (only its lower portion is illustrated in the figure) is rotatably attached at the extending portion 30a via a knuckle 35 (rotational mechanism portion). The seat back frame 50, which is made of a pipe member, for example, and formed in a reverse-U shape, is disposed at an outside portion in the seat back 5. To both lower end portions of the frame 50 are welded brackets 51, 51, which are made of a pressed material, and the brackets 51, 51 are coupled to each other via a pipe member 52.

The pipe member 52 is a rotational (pivotal) axis of the seat back 5, and the knuckles 35, 35 are provided between the brackets 51, 51 and the base side frames 30, 30 so as to be coaxial to the pipe member 52. According to the passenger operating a reclining lever 36 (riot illustrated in FIGS. 3 and 4), a lock member and a cam member in the knuckle 35 is disengaged, not illustrated. Thereby, the seat back 5 is enabled to rotate forward or rearward from its upright position (hereinafter, refereed to as a specified standard position).

Figure 3:
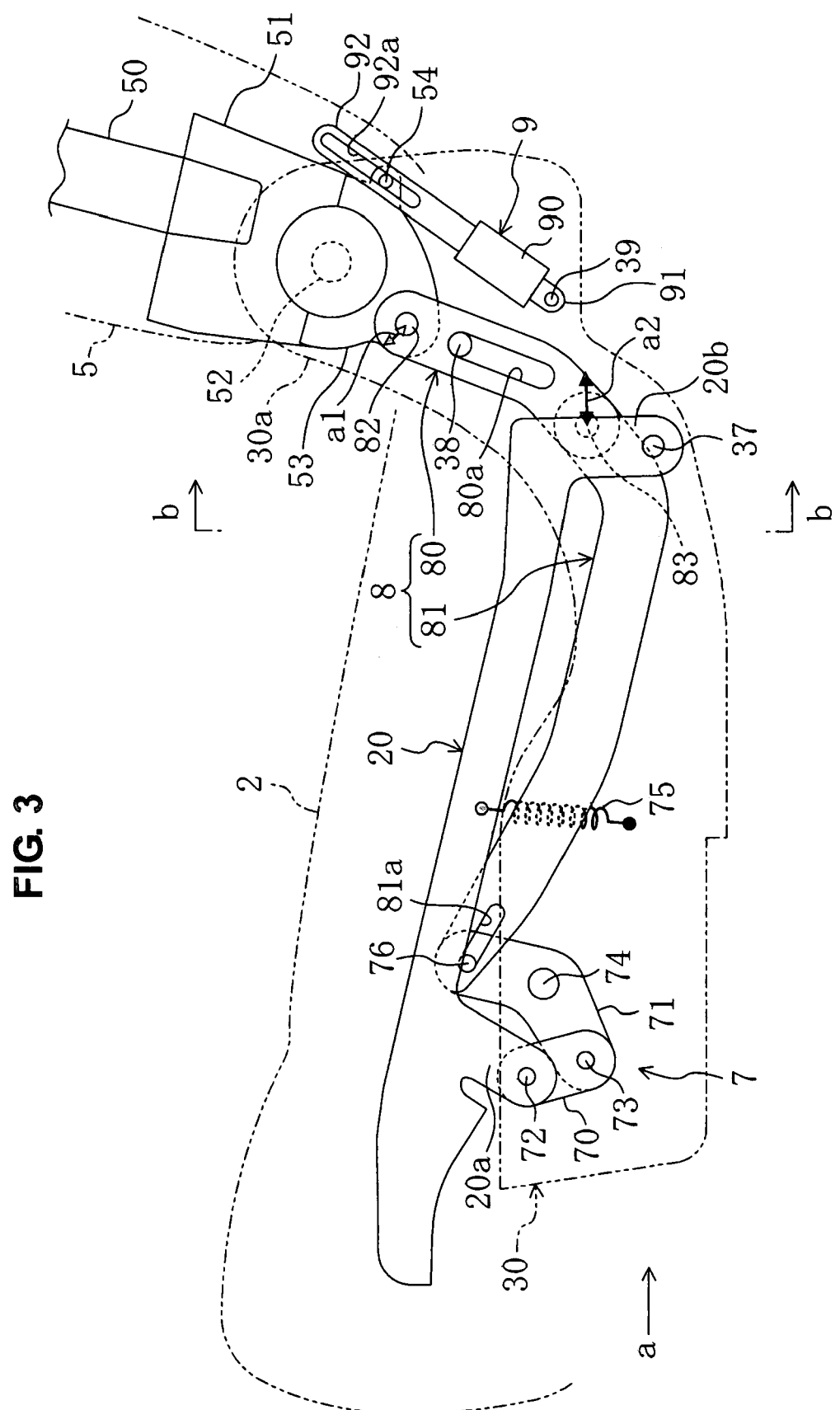
FIG. 3 is an explanatory diagram showing structures of a linkage mechanism portion and a tilt mechanism portion, when viewed from the side.

As shown in FIGS. 3 and 4A, 4B there are provided a tilt mechanism portion 7 to tilt (move substantially vertically) the left-side side fame 20 and a linkage mechanism portion 8 to move the tilt mechanism portion 7 in accordance with a rotation of the seat-back 5, which are provided inside ton the right) the left-side side frame 20 of the seat cushion 2. Thereby, when the seat back 5 is rotated from the specified standard position shown in FIG. 3 (a position which is rotated rearward from a right vertical position by a certain angle of 5-20 degrees) to a reclining position (see FIG. 5) which is rotated rearward from the above-described specified standard position by a specified angle, a front portion of the seat cushion 2 is moved upward in accordance with the rearward rotation of the seat back 5. Accordingly, an inclination of a seat face of the seat can be increased. Herein, the above-described specified angle may be set at an angle that can provide the passenger seated with a desirable reclining angle of the seat back 5 for taking a nap, for example.

First, the tilt mechanism portion 7 will be described. As shown in FIG. 3 and 4A, at the front portion of the cushion side frame 20 is provided an extending portion 20a to extend downward. The extending portion 20a is connected to the front portion of the base side frame 30 via a link 70 and a rotating lever 71 so as to be adjustable in its height. Moreover, as shown in FIGS. 3 and 4B, at the rear end portion of the cushion side frame 20 is provided an extending portion 20b to extend downward. The extending portion 20b is rotatably supported around a support pin 37 attached to the base side frame 30.

Thereby, the cushion side frame 20 is rotated around the support pin 37 to support its rear end extending portion 20b, which enables the seat cushion 2 to rotate around a lateral axis (support pin 37) in such a manner that the front portion of the seat cushion 2 moves substantially vertically (tilt). Herein, there happens little movement of the rear end of the seat cushion 2 despite a vertical movement of its front end (there happens a slight longitudinal movement in the present embodiment because of a rotation of the downward extending portion 20b). Also, the amount of the longitudinal movement (longitudinal moving distance) of the front portion of the seat cushion 2 is smaller than the amount of its vertical movement (vertical moving distance).

More specifically, the front extending portion 20a of the cushion side frame 20 is connected to an upper end of the link 70 via a pin 72. A lower end of the link 70 is rotatably connected to one end of the rotating lever 71 via a pin 73. The rotating lever 71 is a substantially L-shaped bent plate member as shown in FIG. 3, and to its bent portion is fixed a rotational axis 74. The rotational axis 74 is provided so as to extend laterally as shown in FIG. 2, and its both ends are rotatably supported at the base side frames 30, 30.

Figure 5:
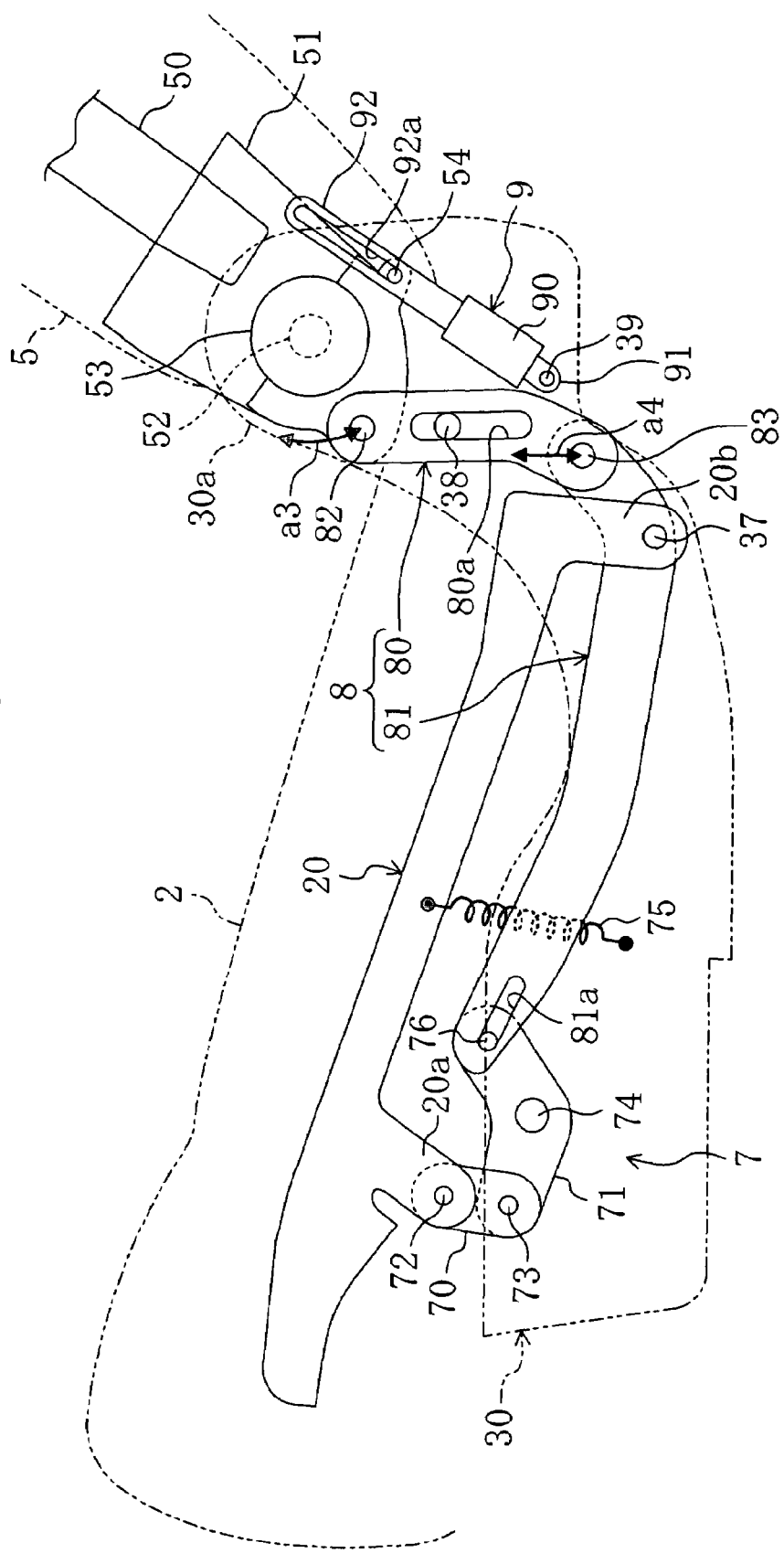
FIG. 5 is an explanatory diagram, corresponding to FIG. 3, at a reclining state.

As shown in FIGS. 3, 5 and others, one end of the rotating lever 71 is configured to extend substantially forward from the rotational axis 74 and move substantially vertically, and the link 70 coupled to the lever 71 is located in front of the rotational axis 74, so that an acting point of a force that acts from the rotating lever 71 to the cushion side frame 20 is located forward. This constitution means that the acting point of the force to the front portion of the seat cushion 2 is away from the rear axial supporting portion (support pin 37). Thereby, the front portion of the seat cushion 2 can be moved vertically by a relatively small force.

The one end of the rotating lever 71 (hereinafter, referred to as an output-side end, sometimes) that moves the cushion side frame 20 via the link 70 as described above is configured to extend obliquely downward from the rotational axis 74 when the seat back 5 is in the specified standard position shown in FIG. 3. Hence, the front portion of the cushion side frame 20 coupled to the output-side end of the lever 71 is located relatively below, where the seat face of the seat cushion 2 is positioned in a predetermined desirable slant state corresponding to the sitting position of the passenger. Hereinafter, this state means that the seat cushion is in a standard position.

In the present embodiment, a coil spring 75, is provided in back of the link 70 and the rotating lever 71 between the cushion side frame 20 and the base side frame 30 so as to extend vertically. The front portion of the cushion side frame 20 is biased downward by a tension of the spring 75. The biasing force of the spring 75 acts on the output-side end of the rotating lever 71 via the link 70 downward, thereby pushing the rotating lever 71 counterclockwise in FIG. 3.

Meanwhile, a stopper portion, not illustrated, is provided at an inside of the base side frame 30, which functions to prevent the cushion side frame 20 from moving downward by engaging with the frame 20 when the seat cushion 2 is in the standard position. Hence, even though the cushion side frame 20 is biased downward by the coil spring 75, the front portion of the cushion side frame 20 does not move further downward from its location that corresponds to the standard position of the seat cushion 2. Therefore, the standard position of the seat cushion 2 is the lowermost position of the front portion of the seat cushion 2.

The other end of the rotating lever 71, which is formed in the substantially L shape, extends substantially upward from the rotational axis 74, and a front end of a second linkage link 81 of the linkage mechanism portion 8 is rotatably connected to the other end of the rotating lever 71 via a pin 76 thereinafter, the other end of the rotating lever 71 is referred to as an input-side end, sometimes). Thus, the rotational movement of the seat back 5 is conveyed via the linkage mechanism portion 8. Thereby, when the seat back 5 is rotated rearward from the specified standard position to the reclining position, the input-side end of the rotating lever 71 is pulled rearward via the second linkage link 81, so that the rotating lever 71 rotates clockwise against the tension force of the coil spring 75 in the figures.

When the rotating lever 71 rotates and its output-side end moves upward, the front portion of the cushion side frame 20 is pushed upward via the link 70. FIG. 5 shows that the seat back 5 is rotated to its reclining position, where the front portion of the seat cushion 2 is in its uppermost position and the seat face is inclined rearward greatly. Thereby, the buttocks of the passenger seated can be held properly and prevented from sliding forward improperly on the seat face. Hereinafter, this position of the seat cushion 2 will be referred to as a tilt position.

As described above, according to the tilt mechanism portion 7 of the present embodiment, the longitudinal movement of the link of the second linkage link 81 in accordance with the rotation of the seat back 5 can be efficiently changed to the vertical movement of the front portion of the seat cushion 2 by the L-shaped rotating lever 71, so the vertical moving distance (the amount of vertical movement) of the front portion of the seat cushion 2 can be made properly large with the compact structure.

Also, since the input-side end of the rotating lever 71 is located above the rotational axis 74, and the input-side end of the rotating lever 71 is pulled rearward in accordance with the rearward rotation of the seat back 5, the input-side end of the rotating lever 71 moves rearward greatly away from the rotational axis 74. Accordingly, any interference between the both can be properly prevented and the desirably compact tilt mechanism portion 7 can be provided.

(Linkage Mechanism Portion)

Next, the linkage mechanism portion 8 will be described. The linkage mechanism portion 8 of the present embodiment comprises a first linkage link 80 and the second linkage link 81, which interconnect an arm member 53 fixed to the bracket 51 of the frame 50 of the seat back 5 and the rotating lever 71 of the tilt mechanism portion 7. One-end (an end on a side of the seat back) of the first linkage link 80 is rotatably coupled to the arm member 53 via a pin 82. The other end (an end on a side of the tilt mechanism portion) of the first linkage link 80 is rotatably coupled to the rear end of the second linkage link 81 via a pin 83. The front end of the second linkage link 81 is rotatably coupled to the input-side end of the rotating lever 71 of the tilt linkage mechanism portion 7 via the pin 76, as described above.

—Slot of First Linkage Link—

In the present embodiment, a slot 80a is provided at the first linkage link 80 so as to extend in a longitudinal direction of the link 80. The slot 80a engages with a support pin 38 that is fixed to the base side frame 30 so as to rotate and slide. Thereby, the movement of the first linkage link 80 is restricted in such a manner that the engagement of the slot 80a and the support pin 38 is maintained while the one end (pin 82) of the first linkage link 80 rotates around the rotational support axis 52 in accordance with the rotation of the seat back 5. As a result, a major movement pattern of the first linkage link 80 is changeable from either one of the rotation around the support pin 38 and the slide guided by the support pin 38 to the other.

Figure 6:
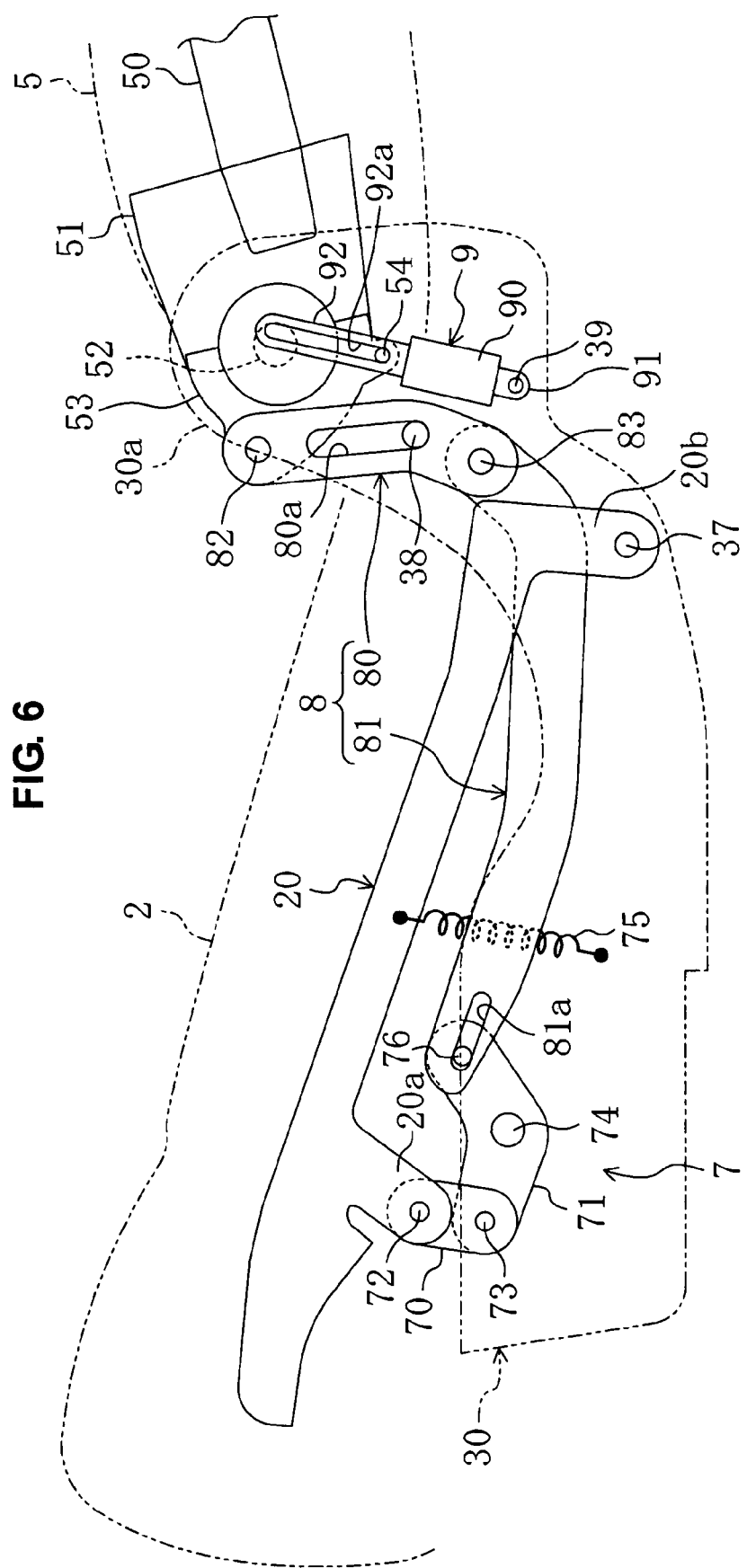
FIG. 6 is an explanatory diagram, corresponding to FIG. 3, at a full-flat state.

More specifically, referring to FIGS. 3, 5 and 6, when the seat back 5 rotates between the specified standard position (FIG. 3) and the reclining position (FIG. 5) for example, the first linkage link 80 provides its major rotational movement around the support pin 38 because the moving direction (shown by an arrow a1 in FIG. 3) of the one end (pin 82) of the first linkage link 80 is greatly different from the extending direction of the slot 80a. Accordingly, the rear end of the second linkage link 81 coupled to the first linkage link 80 moves substantially longitudinally as shown by an arrow a2 in FIG. 3. Thus, the second linkage link 81 entirely moves longitudinally.

Meanwhile, when the seat back 5 rotates rearward beyond the reclining position shown in FIG. 5, the first linkage link 80 moves substantially vertically with the slide, movement of the slot 80a guided by the support pin 38 because the moving direction of the one end (pin 82) of the first linkage link 80 is almost identical to the vertical direction in which the slot 8a extends. Then, when the seat back 5 rotates to its full-flat position shown in FIG. 6, the support pin 38 moves to the lowermost end of the slot 80a of the first linkage link 80.

When the seat back 5 rotates between the reclining position (FIG. 5) and the full-flat position (FIG. 6), the other end (pin 83) of the first linkage link 80 moves substantially vertically as shown by an arrow a4 in FIG. 5. And the second linkage link 81 rotates around the pin 76 at its front end, but moves little longitudinally.

Namely, when the seat back 5 rotates rearward from the specified standard position, the first linkage link 80 provides its rotational major movement till the reclining position of the seat back 5. Accordingly, the tilt mechanism portion 7 is moved via the second linkage link 81 so as to change the inclination of the seat face of the seat cushion 2. Meanwhile, when the seat back 5 rotates further beyond the reclining position, the first linkage link 80 provides its vertically-slide major movement. Accordingly, the tilt mechanism portion 7 moves little and thereby the seat cushion 2 remains its tilt position.

—Assist Damper—

Herein, when the seat back 5 rotates further beyond the reclining position and its rotational movement is not conveyed to the seat cushion 2, the reaction force of the tilt of the seat cushion 2 does not act on the seat back 5, so that the resistance force against the rotation of the seat back 5 may decrease quickly and thereby the passenger may have uncomfortable feelings in operation. Especially, in the present embodiment, since the front portion of the seat cushion 2 is biased downward by the coil spring 75 and this downward biasing force is added as the above-described reaction force of the tilt, the above-described uncomfortable feelings may become improperly greater.

According to the present embodiment, as schematically shown in FIG. 3 and others, a assist damper 9 (resistance-force adding device) is provided between the bracket 51 of the seat back frame 50 and the base side frame 30. The assist damper 9 applies the resistance force to the seat back 5 rotating rearward beyond the reclining position.

Specifically, a well-known oil damper may be used as the assist damper 9, for example. A rectangular connecting portion 91 is provided at an lower end of a casing 90 of the damper 9 and it is rotatably connected to a support pin 39 fixed to the base side frame 30. At a rod 92 extending upward from an upper end of the casing 90 is provided a slot 92a as shown in the figure. The slot 92a engages with a support pin 54 fixed to the bracket 51 of the seat back frame 50 so as to rotate and slide.

The damper 9 is layout in such a manner that the support pin 54 is positioned at the lowermost end of the slot 92a of the damper rod 92 when the seat back 5 is in the reclining position as shown in FIG 5. Thereby, the rod 92 does not stroke despite the rotation of the seat back 5 from the specified standard position to the reclining position, so a damping force is not generated by the assist damper 9. When, the seat back 5 rotates rearward beyond the reclining position, the rod 92 is pushed into the casing 90, so the assist damper generates the damping force that becomes the resistance force against the rearward rotation of the seat back 5.

Thus, since the damping force is applied to the rotation of the seat back 5 rotating rearward beyond the reclining position by the assist damper 9, even if the reaction force of the tilt of the seat cushion 2 does not act, the resistance force can be prevented from decreasing quickly after the rotation of the seat back 5 beyond the reclining position. Thus, the passenger does not have uncomfortable feelings.

—Slot of Second Linkage Link—

In the present embodiment, a slot 81*a* is provided at the front end portion of the second linkage link 81 coupled to the output-side end of the rotating lever 71. The connecting pin 76 engages with the slot 81*a* so as to rotate and slide. The slot 81*a* extends longitudinally as shown in FIG. 3 and others, and the front end of the second linkage link 81 is connected to the input-side end of the rotating lever 71 so as to rotate and slide substantially longitudinally.

There is a case where the longitudinal movement of the second linkage link 81 in accordance with the rotation of the seat back 5 is not conveyed to the rotating lever 71 because of the connection via the slot 81*a* and the tilt mechanism portion 7 does not move accordingly. Namely, when the seat back 5 and the seat cushion 2 are in their standard position, the pin 76 is positioned at the front end of the slot 81*a* of the second linkage link 81 as shown in FIG. 3. Then, even if the second linkage link 81 moves forward, the pin 76 just slides relatively rearward in the slot 81*a* without being pushed forward by the link 81.

Figure 7:
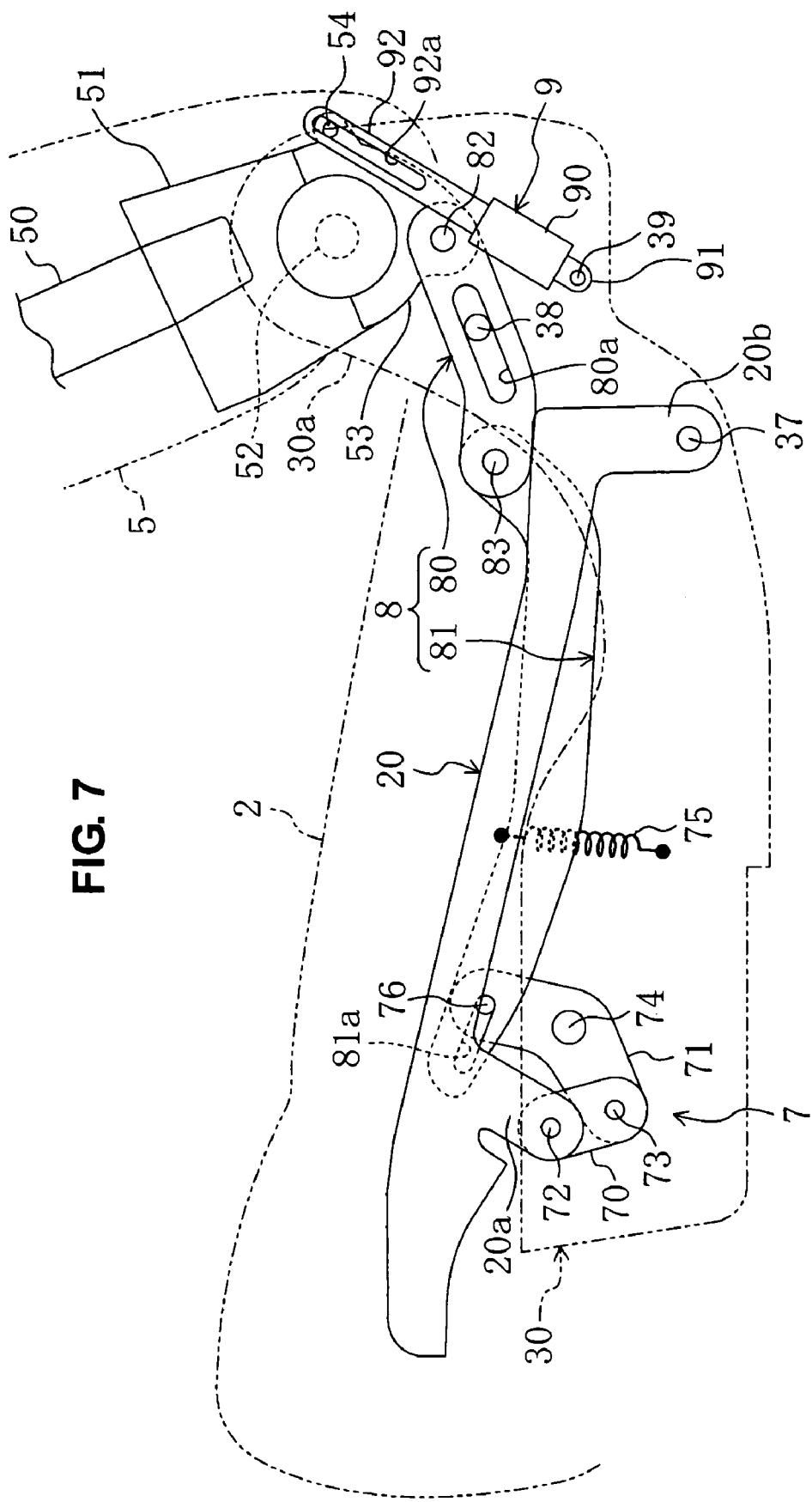
FIG. 7 is an explanatory diagram, corresponding to FIG. 3, when a seat back is rotated forward.

At this moment, the seat cushion 2 is in a state where its downward movement is prevented by the stopper portion via the cushion side frame 20. Accordingly, the rotating lever 71 is prevented from rotating counterclockwise in FIG. 3 and others. Thus, when the seat back 5 rotes between the specified standard position (FIG. 3) and the forward-rotated position from the standard position (FIG 7), the first linkage link 80 rotates and the second linkage link 81 moves longitudinally accordingly. However, such movements are not conveyed to the rotating lever 71, so that the seat cushion 2 remains in its standard position.

Meanwhile, when the seat back 5 is located between the specified standard position (FIG. 3) and the reclining position (FIG. 5), the seat cushion 2 is also located between its standard position and the tilt position. Accordingly, the tension force of the coil spring 75 acting on the cushion side frame 20 acts on the rotating lever 71 via the link 70 so as to bias it counterclockwise in FIG. 3 and others. Thus, when the seat backs returns from the reclining position to the specified standard position, the pin 76 moves forward keeping its location at the front end of the slot 81*a* in accordance with the forward movement of the second linkage link 81. Accordingly, the rotating lever 71 rotates.

When the seat back 5 rotates rearward toward the reclining position, the second linkage link 81 moves rearward pulling the pin 76 at the front end of the slot 81*a*. Thus, the rotating lever 71 rotates clockwise in FIG. 3 and others against the rotating basing force by the tension force of the coil spring 75.

In other words, according to the present embodiment, at the second linkage link 81 is provided the slot 81*a* at the connecting portion to the tilt mechanism portion 7 so that the conveyance of the rotational movement of the seat back 5 to the tilt mechanism portion 7 is restrained when the seat back 5 rotates forward from the specified standard position. Herein, although there is a concern that the conveyance of the rotational movement of the seat back 5 to the tilt mechanism portion 7 may be restrained when the seat back 5 returns to the specified standard position from its rearward-rotated position, the front portion of the seat cushion 2 is biased downward by the tension force of the coil spring 75. Thus, the rotational movement of the seat back 5 returning from the reclining position is conveyed to the tilt mechanism portion 7.

(Movement of Seat)

Next, the movement of the seat 1 according to the present embodiment will be described referring to FIGS. 3, 5-7. First, when the seat back 5 rotates rearward from the specified standard position shown in FIG. 3, the arm member 53 at the lower-end of the seat back 5 rotates clockwise around the rotational support axis 52, and accordingly the first linkage link 80 rotates counterclockwise around the support pin 38 and the second linkage link 81 moves rearward, thereby pulling the input-side end of the rotating lever 71 rearward. Thus, the rotating lever 71 rotates clockwise in FIG. 3 and others and causes the front portion of the cushion side frame 20 via the link 70 to move upward against the tension force of the coil spring 75.

In accordance with the rising of the front portion of the seat cushion 2, the rearward inclination of the seat face of the seat cushion 2 gradually increases, so that the buttocks of the passenger seated can be held properly. When the seat back 5 is located in the reclining position shown in FIG. 5 to provide the desirable inclination of the seat back 5 for the passenger taking a nap, the seat cushion 2 is in the tilt position to provide a relatively large inclination, so that the buttocks of the passenger can be prevented from sliding forward improperly on the seat face.

Herein, even when the font portion of the seat cushion 2 moves up to the uppermost position, the rear end of the seat cushion 2 moves forward little (it moves rather rearward a little in this example), so the large gap is not generated between the rear end of the seat cushion 2 and the lower end of the seat back's taking its reclining position. Thus, part of the buttocks of the passenger can be properly prevented from being caught in this gap, thereby providing the proper sitting to the passenger.

In accordance with the further rearward inclination of the seat back 5, the first linkage link 80 moves substantially upward with the support pin 38 sliding in the slot 80*a*. Accordingly, the second linkage link 81 rotates counterclockwise, upward) around its front end (pin 76), without little longitudinal moving. Thus, until the seat back 5 moves to the full-flat position (FIG. 6), the rotating lever 71 does not rotate and the seat cushion 2 remains in the tilt position.

As described above, when the seat back 5 rotates rearward beyond the reclining position, its rotational movement is not conveyed to the tilt mechanism portion 7 and the seat cushion 2 remains in the tilt position. Accordingly, it can be prevented for the inclination of the seat face of the seat cushion 2 to become too large even if the seat back 5 rotates rearward greatly. Hence, the proper sitting and operation of the reclining lever or the like can be provided to the passenger.

Moreover, when the rotational movement of the seat back 5 is not conveyed to the tilt mechanism portion 7 during its rotation, the reaction force from the tilt mechanism portion 7 does not act on the seat back. However, since the assist damper 9 generates the damping force and thereby the resistance force is applied to the rearward rotation of the seat back 5, this resistance force can be prevented from decreasing quickly. Thus, the passenger may not have uncomfortable feelings.

When the seat back 5 returns to the specified standard position from the rearward position beyond the reclining position, until its returning to the reclining position, the second linkage link 81 only rotates around the front end pin 76) and the rotating lever 71 does not rotate despite the rotation of the seat back 5 as described above. Meanwhile, while it returns to the specified standard position from the reclining position, the first linkage link 80 rotates clockwise around the support pin 38 in FIG. 3 and others. Thereby, the second linkage link 81 moves forward, and the rotating lever 71 is rotated counterclockwise by the rotational biasing force of the coil spring 75.

Thus, as the seat back 5 gradually rises from the reclining position to the specified standard position, the front portion of the seat cushion 2 gradually lowers with the tension force of the coil spring 75 and the inclination of the seat face gradually becomes small. As a result, the seat face of the seat cushion 2 gets its proper inclination state corresponding to the inclination of the seat back 5.

When the seat back 5 rotates forward after returning to the specified standard position, the first linkage link 80 rotates around the support pin 38 and the second linkage link 81 moves forward. Herein, since the seat cushion 2 has been in the specified standard position at this moment and its front portion cannot move downward further more, the rotating lever 71 does not rotate and the pin 76 at its input-side end slides rearward in the slot 81a of the second linkage link 81.

Namely, the rotational movement of the seat back 5 is absorbed by the slot 81a of the second linkage link 81 of the linkage mechanism portion 8 so as not to be conveyed to the tilt mechanism portion 7. Likewise, when the seat back 5 rotates from the forward-rotated position to the specified standard,position, the rotational movement of the seat back 5 is absorbed by the slot 81a of the second linkage link 81 so as not to be conveyed to the tilt mechanism portion 7.

—Effects of the Embodiment—

According to the seat 1 of the automotive vehicle present embodiment, the seat cushion 2 can be tilted in accordance with the rotation of the seat back 5 taking the reclining position so as to provide the proper inclination of the seat face. Herein, since the gap generated between the seat cushion 2 and the seat back 5 is kept properly small, the conformability of the passenger seated can be improved.

Further, when the seat back 5 rotates rearward greatly by the specified rotational angle beyond the specified standard position, the conveyance of the rotational movement is restrained so as to keep the tilt position of the seat cushion 2. Thereby, it can be prevented that the inclination of the seat face becomes too large, thereby improving comfortable sitting and an operational performance of the seat with a simple and compact structure.

Herein, since the damping force is applied by the assist damper 9 considering the situation in which the reaction force does not act on the seat back 5 due to non-tilting movement occurring of the seat cushion 2 during the rearward rotation of the seat back 5, the resistance force against the rotation of the seat back 5 can be prevented from decreasing quickly during its reclining movement. Thus, the passenger may not have uncomfortable feelings.

Moreover, even if the seat back 5 is rotated forward from the specified standard position due to an impact caused by a vehicle crash, the seat cushion 2 can be kept in its standard position and the inclination of the seat face can be prevented from becoming too small. Thus, a situation, so-called submarine phenomenon, in which the passenger would slip off the seat, can be properly prevented.

Additionally, in a case where the ottoman 4 is installed at the front end of the seat cushion 2 like the present embodiment, the above-described no (or little) change of the front portion of the seat cushion 2 in height despite the forward rotation of the seat back 5 from the specified standard position means that there may be no need of any measures to avoid improper interference of the lower end of the ottoman stored with the vehicle floor, such as positioning the ottoman at a higher level, or forming a recess on the vehicle floor. This can provide a high flexibility in designing.

Other Embodiments

The seat device according to the present invention is not limited to the above-described embodiment, but any other modification can be applied. The slot 80a of the first linkage link 80 engages with the support pin 38 on the side of the base side frame 30 in the seat 1 of the above-described, embodiment. This is because the seat 1 is attached to the vehicle floor via the sliders 33 and the slide rails 34 so as to move longitudinally. But, the support pin 38 may be attached to the vehicle floor, a pillar or the like as long as it is provided at a member that does not move (is fixed) regardless of the rotation of the seat back 5 or the tilt movement of the seat cushion 2.

The assist damper 9 is provided to prevent the resistance force from decreasing quickly in the seat 1 of the above-described embodiment. This is because the seat 1 is a so-called manual type of seat in which the seat back 5 is manually operated for reclining. A assist spring, however, may be applied instead of the assist damper 9.

Figure 8:
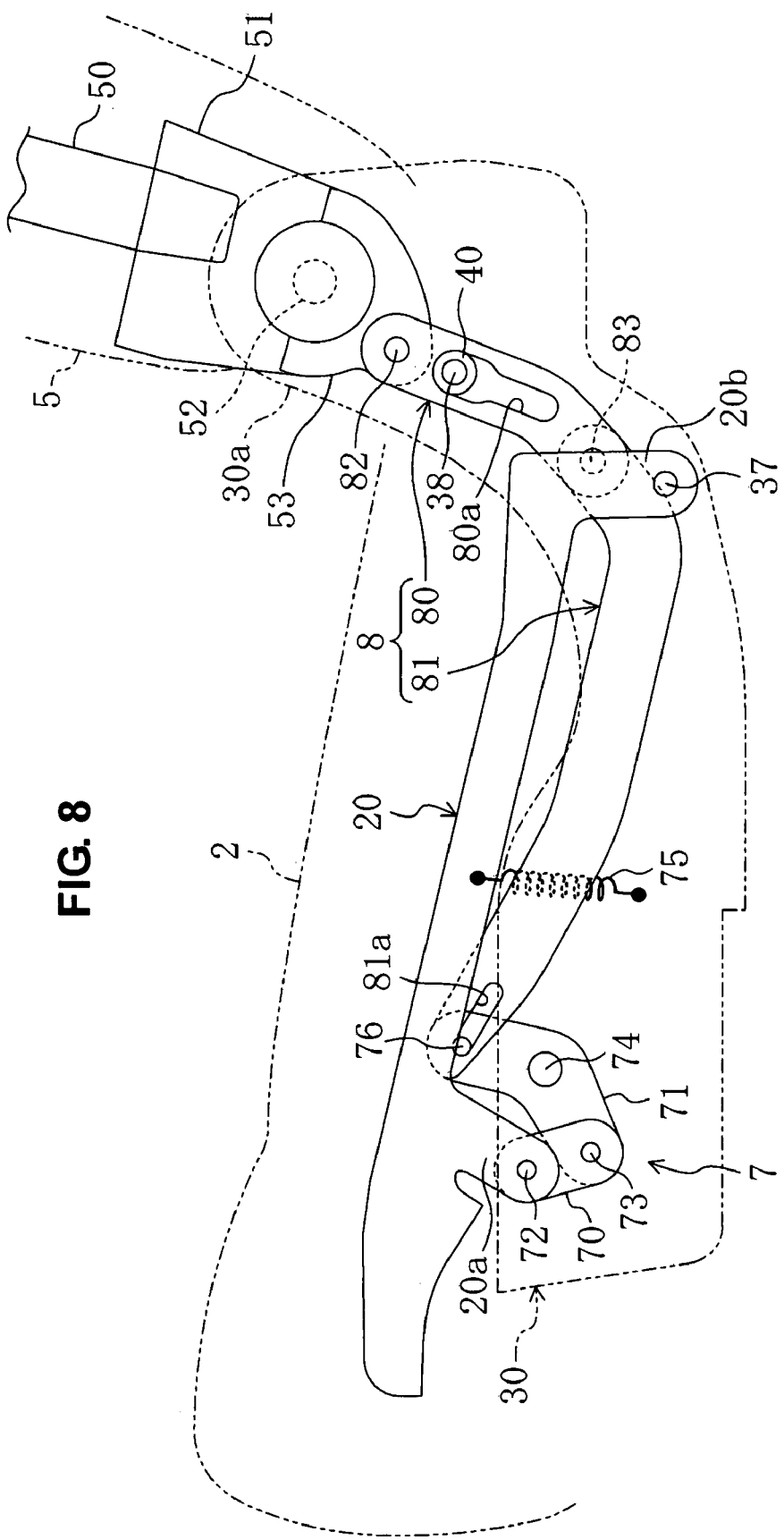
FIG. 8 is an explanatory diagram, corresponding to FIG. 3, of another embodiment having a different shape of a slot provided at a link.

Or, as shown in FIG. 8, the slot 80a of the first linkage link 80 may be configured to have a different width between its portion on a side of the seat back 5 and its portion on a side of the tilt mechanism portion 7, and a rubber ring 40 maybe applied around the support pin 38 engaging with the slot 80a so that the resistance force of the support pin 38 receiving when sliding in the slot 80a can change during the reclining movement of the seat back 5.

In an embodiment shown in the figure, the width of the slot 80a on the side of the seat back 5 is wide and the resistance force of the support pin 38 sliding this portion is small. Meanwhile, the width of the slot 80a on the side of the tilt mechanism portion 7 is relatively narrow and the resistance force of the support pin 38 sliding this portion is relatively large with compression of the rubber ring 40. Herein, the border of the width change is set to correspond to the reclining position of the seat back 5, so the larger resistance force is applied to the rotational movement of the seat back 5 when the seat back 5 rotates rearward from the specified standard position beyond the reclining position. The different-width slot 80a and the rubber ring 40 constitute a resistance-force adding device in this embodiment.

—Example of Power Seat—

Figure 9:
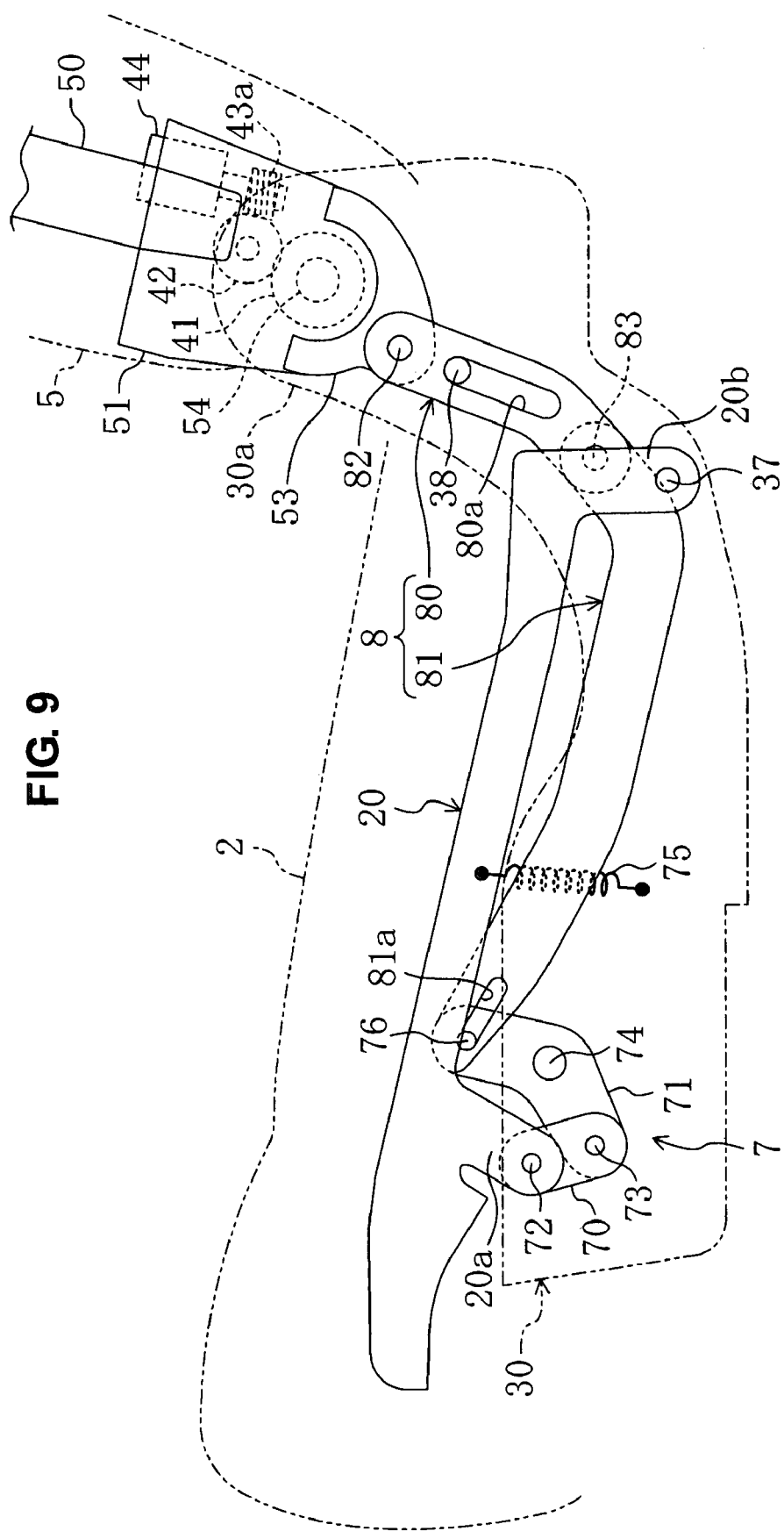
FIG. 9 is an explanatory diagram, corresponding to FIG. 3, of further another embodiment applied to a power seat.
Figure 10:
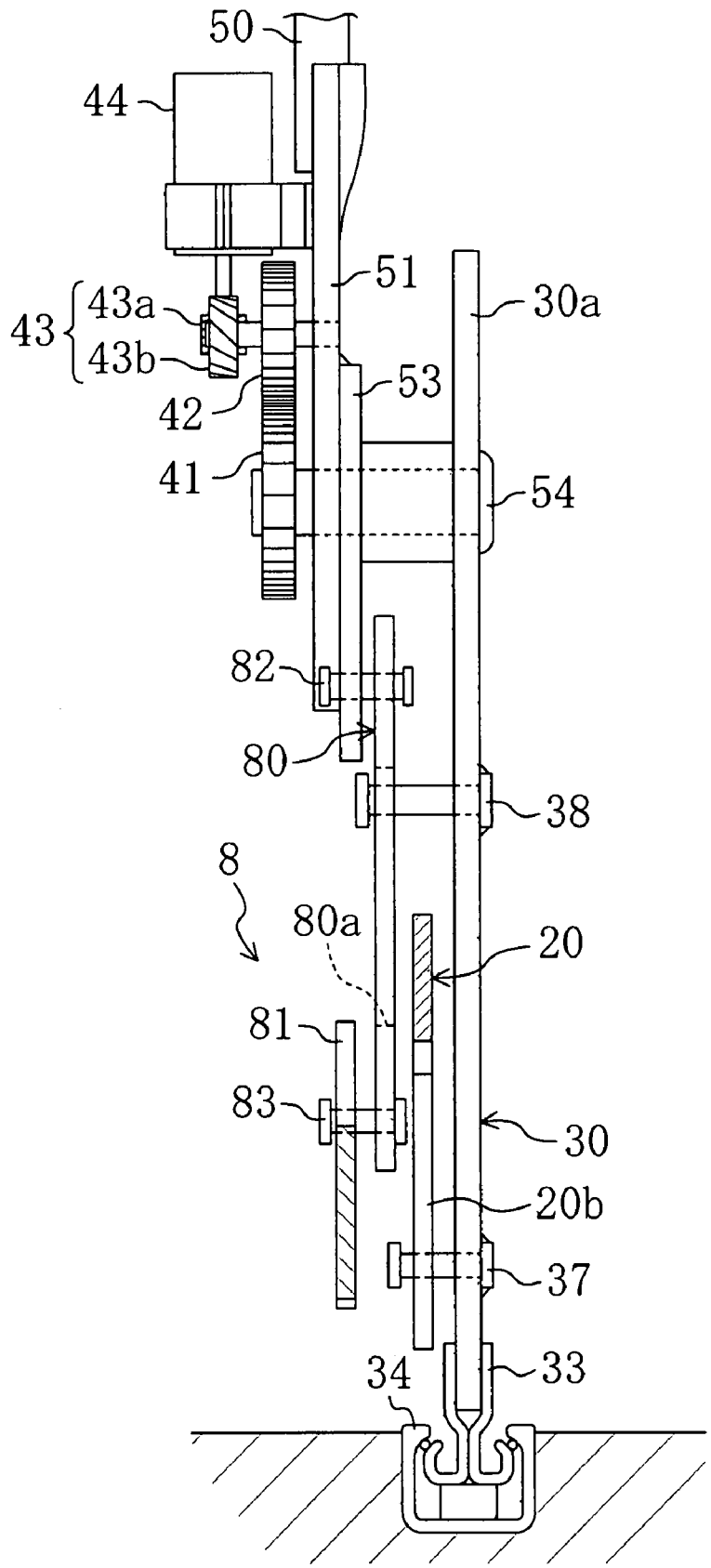
FIG. 10 is a sectional view corresponding to FIG. 4B.

The present invention can be applied to a so-called power seat in which the seat back 5 is driven by a drive power of an electric motor or the like. As shown in FIGS. 9 and 10, instead of the rotational support axis 52 interconnecting the brackets 51, 51 of the seat back frame 50, there is provided a support axis portion 54 to rotatably support the bracket 51, extending inward from the base side frame 30. A gear 41 is fixed to an inner end of the support axis portion, and a gear 42 engaging with the gear 41 is rotatably attached to the bracket 51. Further, a worm gear 43 (a worm 43a, a worm wheel 43b) is attached to rotate together with the gear 42, which is driven by an electric motor 44.

Thus, the worm 43a is rotated by the electric motor 44, and the worm wheel 43b is rotated by the worm 43a. Thereby, the rotating-gear 42 rotates around the fixed gear 41, the seat back frame 50 rotates around the support axis portion 54, and finally the seat back 5 is rotated. Accordingly, since the seat back 5 is rotated to the reclining position by the drive force of the electric motor 44, even if the resistance force against the rotation of the seat back 5 may decrease quickly, the passenger may not perceive that and thus may not have uncomfortable feelings.

Herein, while the electric motor 44 constitutes a drive device to rotate the seat back 5 via the rotational mechanism portion 8, the motor 44 may be configured to rotate (drive) the seat back 5 only between the reclining position and the full-flat position of the seat back 5. Further, the rotation of the electric motor 44 may be prevented by engaging the gear 41, 42, for example, so a holding member (not illustrated) to hold the rotational position of the seat back 5 may be provided.

—Example of One Linkage Link—

The tilt mechanism portion 7 and the linkage mechanism portion 8 of the above-described embodiment is just one example and should not be limited to this. The linkage mechanism portion 8 may be comprised of one (single) link 85 as shown in FIGS. 11-15, for example. Herein, the seat 1 shown in these figures has substantially the same structure as that of the above-described embodiment, except following structures of the tilt mechanism portion 7, the linkage mechanism portion 8 and the arm member 55. Accordingly, the same members are denoted by the same reference characters, and descriptions of those will be omitted here.

Figure 11:
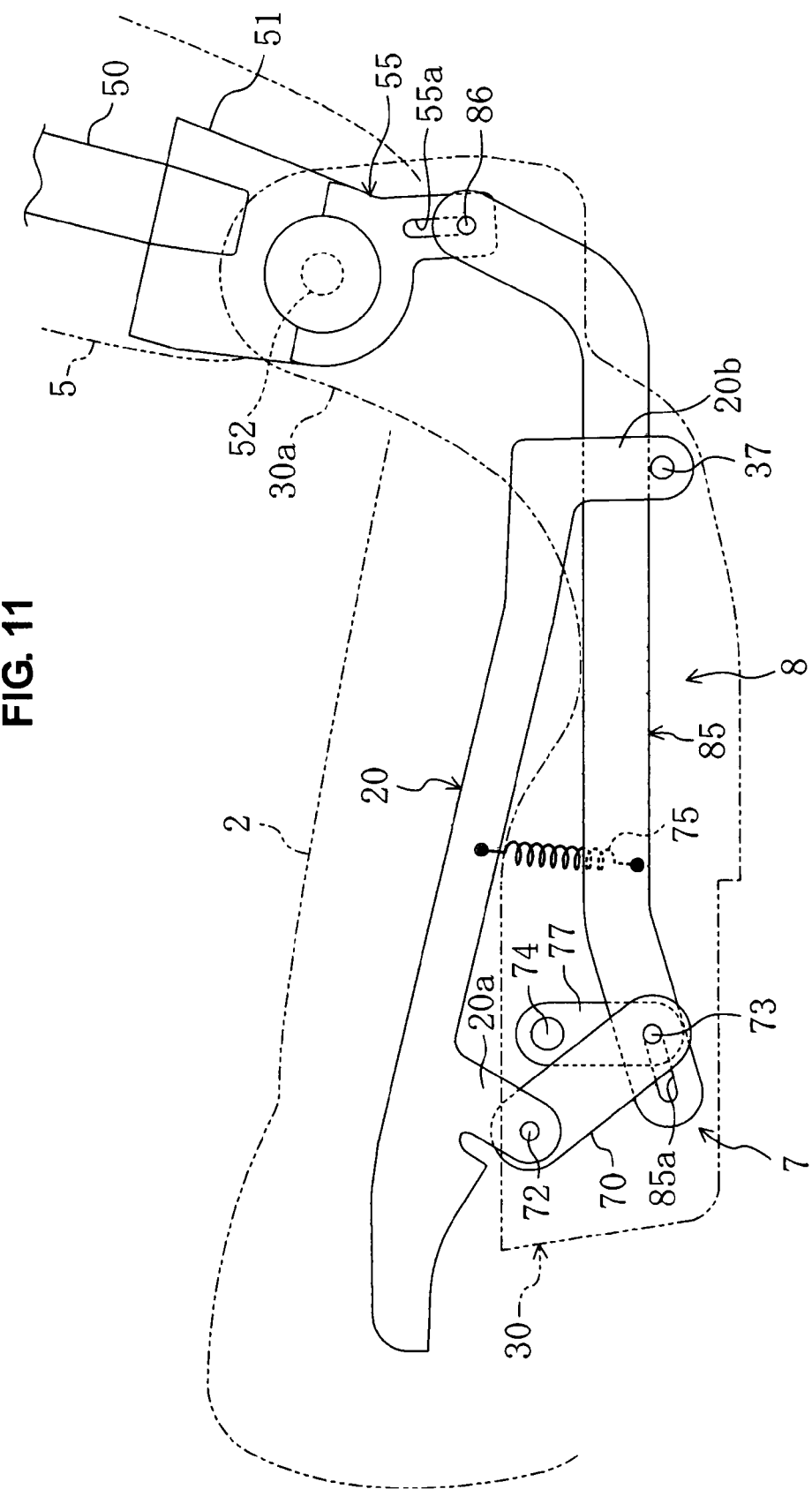
FIG. 11 is an explanatory diagram, corresponding to FIG. 3, of further another embodiment having the linkage mechanism portion with a single link.

A rotating lever 77 of the tilt mechanism portion 7 of the present embodiment in FIG. 11 is provided. The rotational axis 74 is fixed to one end (upper end in the figure) of the lever 77, and the other end (lower end in the figure) of the lever 77 is comprised of a link that constitutes both its input side and its output side. The link 70 coupled to the rotating lever 77 via the pin 73 has a longer length than the one of the above-described embodiment. The front end portion of the above-described linkage link 85 is coupled to the pin 73 connecting the both via a slot 85a so as to rotate and slide.

The linkage link 85 is a long link formed in a L-shape, which appears to unify the first and second linkage links 80, 81 of the previous embodiment, and its rear bent portion extends upward beside the upward-extending portion 30a of the base side frame 30 and the arm member 55 of the seat back 5 is rotatably connected to its upper end of the upward-extending rear bent portion via a pin 86. The arm member 55, which rotates along with the seat back 5 to convey its rotational movement to the linkage mechanism portion 8, like the one (arm member 53) of the previous embodiment but has a different shape and position from that, has a slot 55a as shown in the figure. The above-described pin 86 attached to the rear end of the linkage link 85 engages with this slot 55a so as to rotate and slide.

Figure 12:
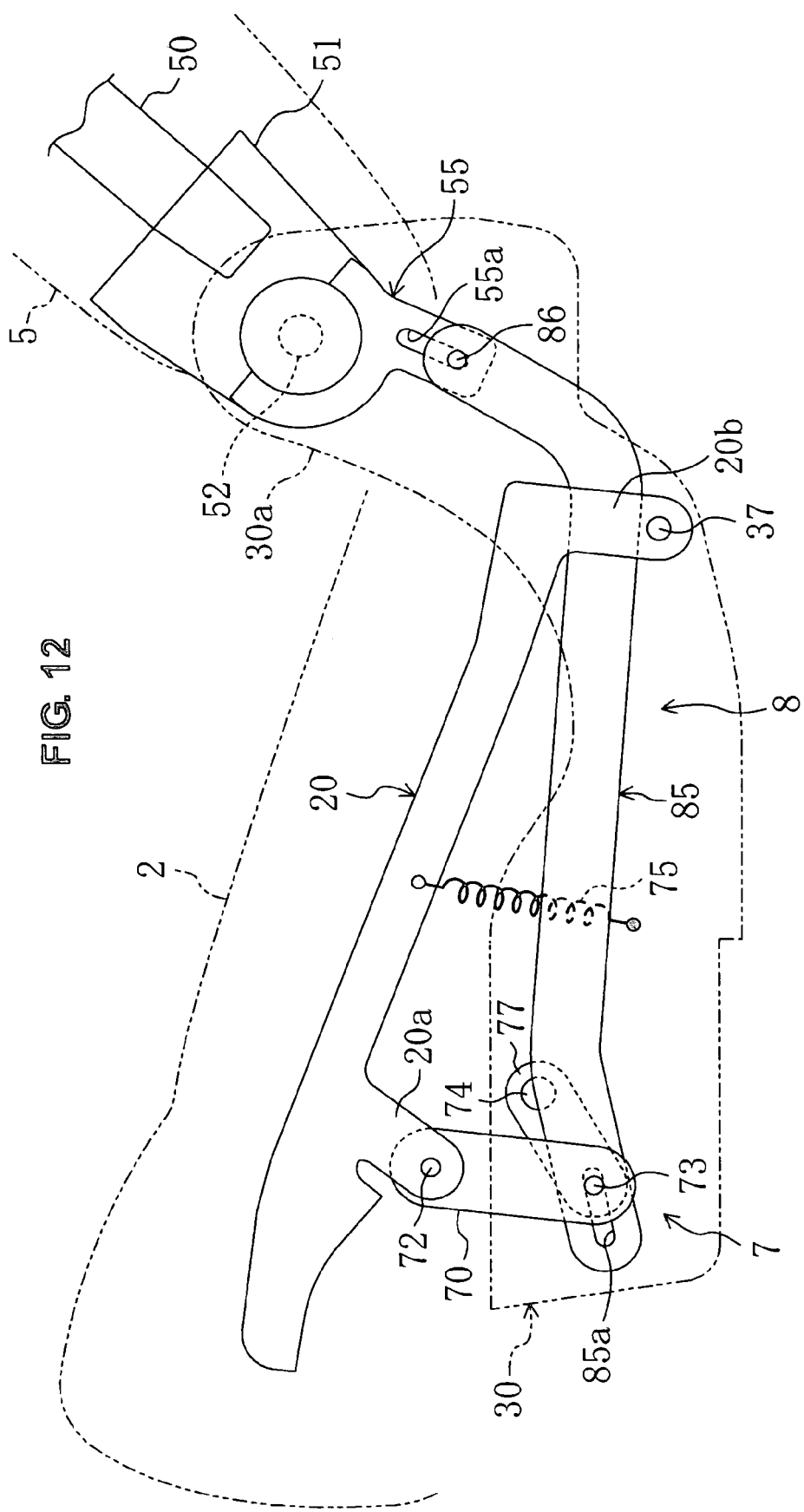
FIG. 12 is an explanatory diagram corresponding to FIG. 5.

When the seat back 5 rotates rearward from the specified standard position shown in FIG. 11 to the reclining position shown in FIG. 12, the connecting portion (pin 86) to the arm member 55 rotates clockwise around the rotational support axis 52 in accordance with the rotation of the seat back 5, so the linkage link 85 moves forward. Thereby, the lower end of the rotating lever 77 rotates clockwise around the rotating axis 74, and the front portion of the cushion side frame 20 is raised via the link 70. Thus, the seat cushion 2 is located in the tilt position in which its front portion is in the uppermost position.

Then, the seat back 5 rotates rearward further beyond the reclining position (FIG. 12), the pin 86 at the rear end of the linkage link 85 slides in the slot 55a of the arm member 55. Thereby, the linkage link 85 just rotates around its front end (pin 73) despite the rotation of the arm member 55 around the support axis 52 in accordance with the rotation of the seat back 5, and it does not cause movements of the rotating lever 77 and the link 70. Thus, the seat cushion 2 is kept in the tilt position until the seat back 5 moves its full-flat position shown in FIG. 13.

Figure 14:
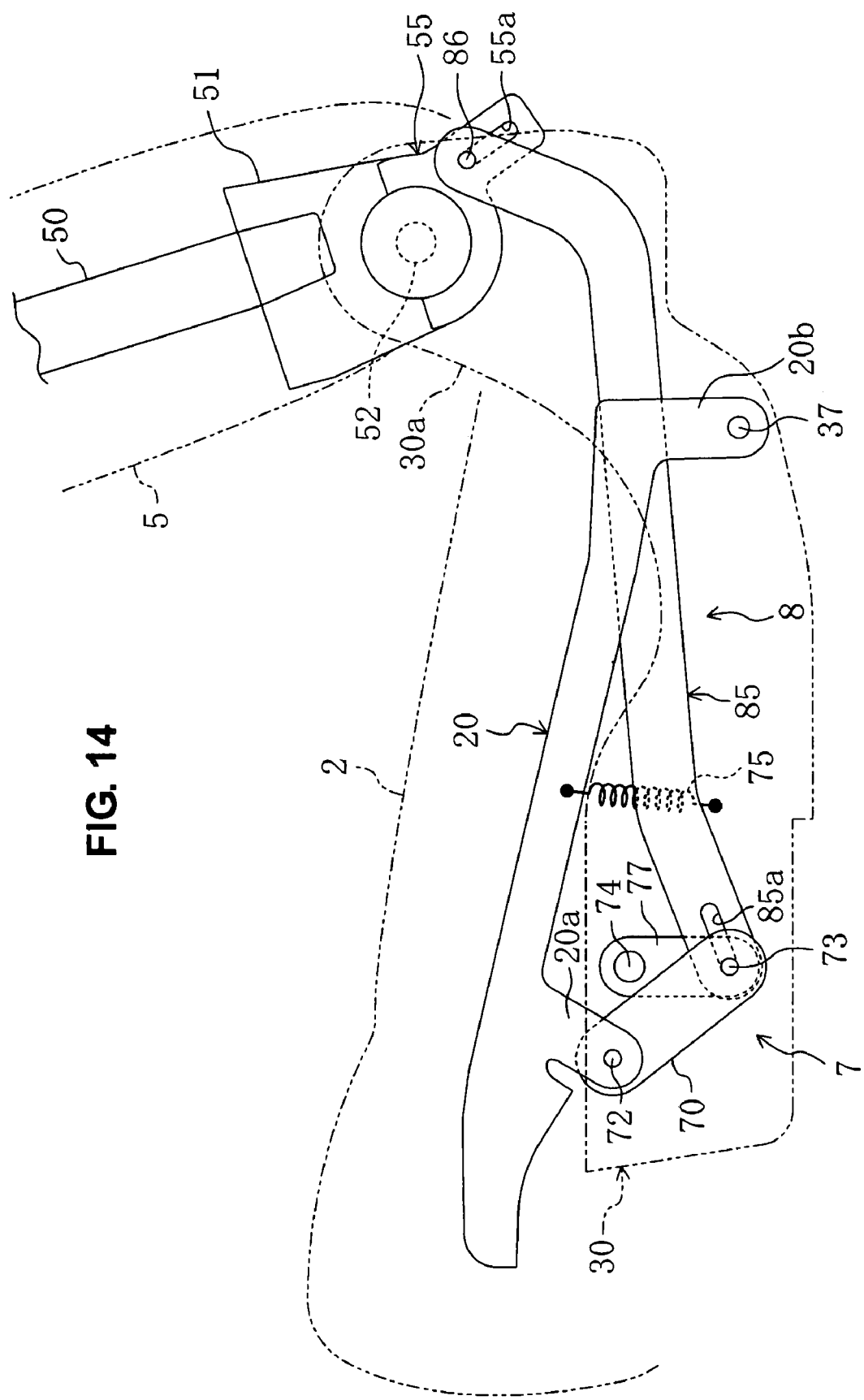
FIG. 14 is an explanatory diagram corresponding to FIG. 7.

Meanwhile, when the seat back 5 rotates forward from the specified standard position (FIG. 11); the arm member 55 rotates clockwise around the support axis 52, and the connecting portion (pin 86) moves obliquely upward and rearward, so the linkage link 85 moves rearward. Herein, while the pin 73 slides in the slot 85a of the linkage link 85 moving rearward, it is not pulled rearward. Accordingly, the rotating lever 77 and the link 70 do not move. Thus, the seat cushion 2 is kept in the tilt position as shown in FIG. 14.

Then, when the seat back 5 rotates forward further and the arm member 55 rotates further around the support axis 52, the rear end of the linkage link 85 is further pulled upward and rearward by the pin 86. Herein, the pin 73 is located at the front end of the slot 85a, so the pin 73 is also pulled obliquely upward and rearward in accordance with the movement of the linkage link 85. Thus, the rotating lever 77 rotates counterclockwise around the rotating axis 74 in the figure.

Figure 15:
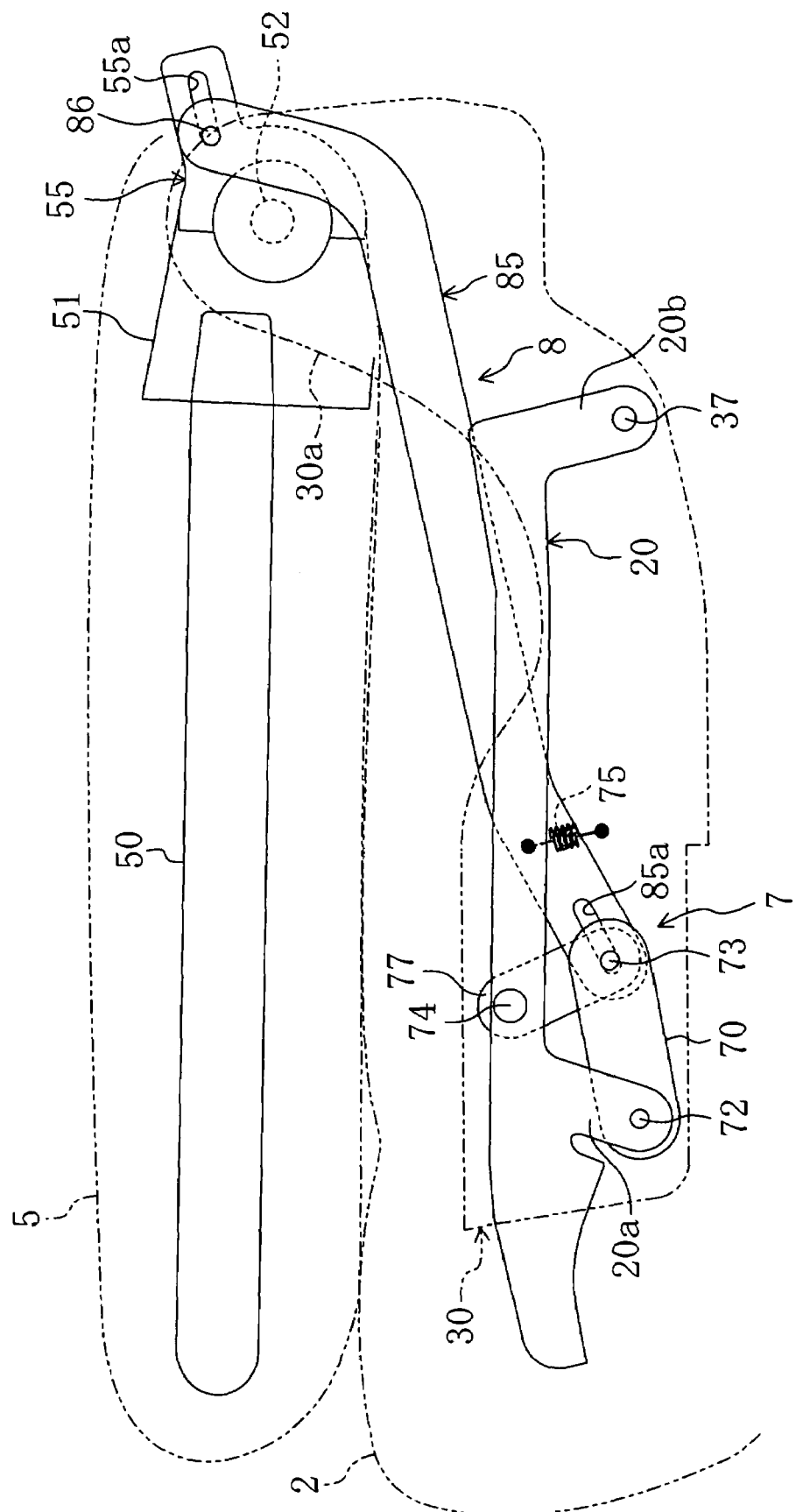
FIG. 15 is an explanatory diagram, corresponding to FIG. 5, when the seat back is rotated forward.

In accordance with the rotation of the rotating lever 77, the front portion of the cushion side frame 20 is pulled upward via the link 70, so the seat face of the seat cushion 2 lowers as shown in FIG. 15. Thereby, the seat back 5 can be rotated forward greatly without interference with the seat cushion 2 in such a manner that its back face is in the substantially horizontal position.

Herein, since the linkage link 85 is connected to the arm member 55 and the rotating lever 77 via the slots 55a, 85a respectively as described above, the seat cushion 2 is allowed to rotate just by approximately 15 degrees of angle (specified second angle) while the seat back 5 rotates forward from the specified standard position (FIG. 11) to the forward-rotated position (FIG. 15) by more than 90 degrees (specified first angle). Thus, since the downward tilt angle of the seat cushion 2 is relatively small, there is no need of the seat cushion 2 being provided far away from the vehicle floor. Thus, a high flexibility in designing of the seat cushion 2 can be provided.

Figure 13:
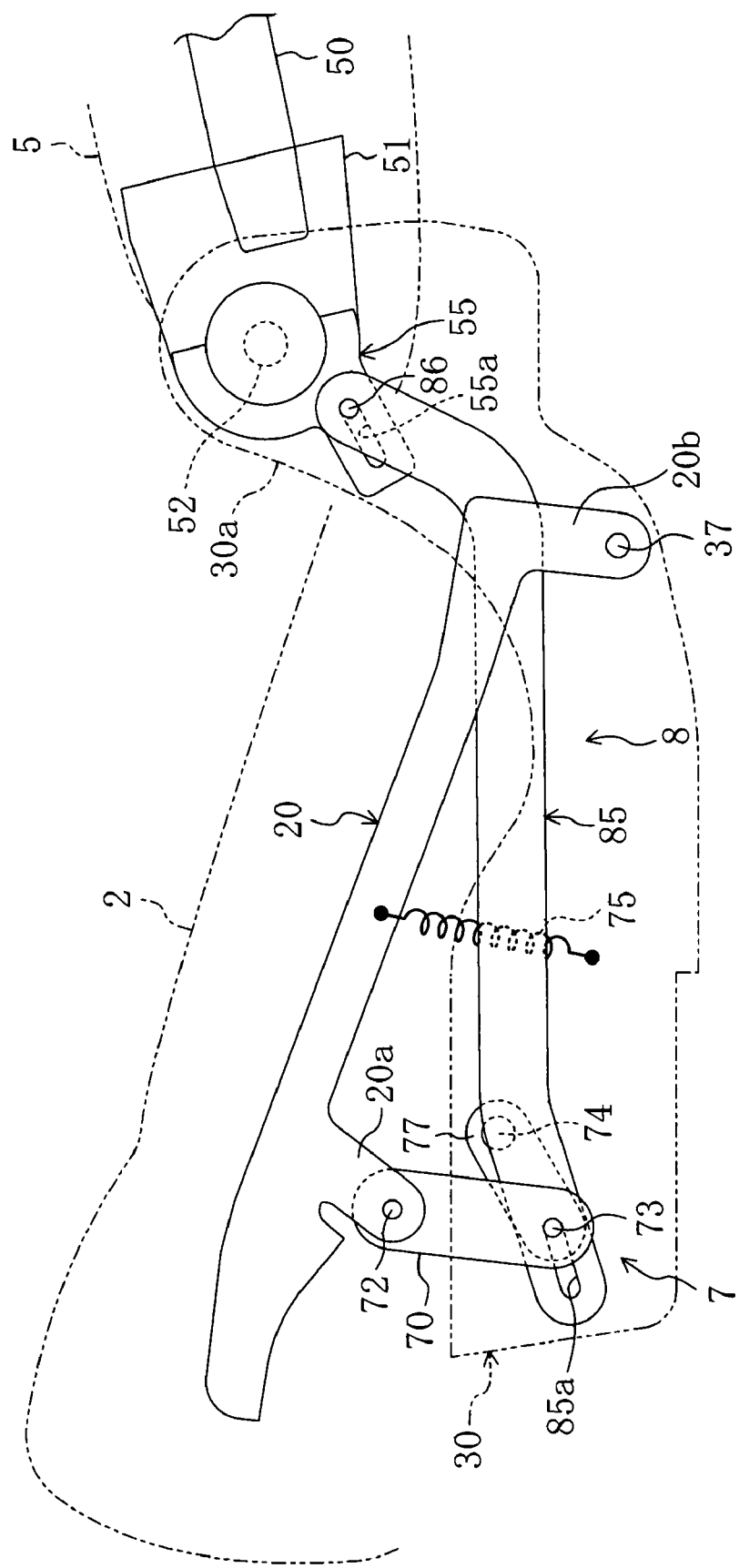
FIG. 13 is an explanatory diagram corresponding to FIG. 6.

Further, as shown in FIGS. 12, 13 and others, since the linkage link 85 is formed in the L shape, the linkage link 85 may not extend improperly upward even when the seat back 5 rotates rearward greatly. Thus, interference of the seat cushion 2 with the cushion body or the like can be easily avoided.

What is claimed is:

1. A seat device, comprising:
   a rotational mechanism portion to enable a seat back to at least rotate rearward around a lower end thereof from a specified standard position thereof;
   a tilt mechanism portion to enable a front portion of a seat cushion to at least move substantially vertically; and
   a linkage mechanism portion to make the tilt mechanism portion move the front portion of the seat cushion substantially vertically in accordance with a rotation of the seat back enabled by the rotational mechanism portion,
   wherein said tilt mechanism portion is configured such that a vertical moving distance of the front portion of the seat cushion is greater than a longitudinal moving distance thereof when the front portion of the seat cushion moves between a lowermost position and an uppermost position thereof,
   wherein said linkage mechanism portion comprises a slot operative to restrain conveyance of a rotational movement of the seat back to said tilt mechanism portion when the seat back is positioned within a specified rotational range, the slot being formed at a constituting member of the linkage mechanism portion,
   wherein said linkage mechanism is configured to make said tilt mechanism portion move the front portion of the seat cushion to the uppermost position when the seat back is rotated rearward to a reclining position thereof by a specified angle from the specified standard position,
   wherein said linkage mechanism is configured such that said slot of the link works so as to maintain the front portion of the seat cushion at the uppermost position when the seat back is rotated rearward further from the reclining position.

2. The seat device of claim 1, wherein said linkage mechanism portion comprises at least one link that moves substantially longitudinally in accordance with the rotation of the seat back, and said tilt mechanism portion comprises a rotating lever that is attached at a portion on a fixed side so as to rotate around a rotational axis extending substantially laterally, one end of the rotating lever being rotatably coupled to a member on a side of the seat cushion, the other end of the rotating lever being rotatably coupled to a front end of said one link of the linkage mechanism portion.

3. The seat device of claim 2, wherein a rear portion of the seat cushion is attached at a portion on a fixed side so as to rotate around an axis extending substantially laterally.

4. The seat device of claim 3, wherein said one end of the rotating lever is located in front of said rotational axis of the rotating lever.

5. The seat device of claim 4, wherein said one end of the rotating lever is connected to the front portion of the seat cushion via at least one link.

6. The seat device of claim 5, wherein the other end of the rotating lever is located above said rotational axis of the rotating lever, and said linkage mechanism portion is configured in such a manner that the other end of the rotating lever is pulled rearward in accordance with the rearward rotation of the seat back.

7. The seat device of claim 1, wherein said linkage mechanism portion is configured such that the conveyance of the rotational movement of the seat back to the tilt mechanism portion is further restrained when the seat back is rotated forward from the specified standard position.

8. The seat device of claim 1, wherein said linkage mechanism portion is configured such that the front portion of the seat cushion is located in the lowermost position by the tilt mechanism portion when the seat back is in the specified standard position, while the front portion of the seat cushion is moved upward by the tilt mechanism portion when the seat back is rotated rearward from the specified standard position, and there is provided a biasing member to bias the front portion of the seat cushion downward to the lowermost position.

9. A seat device, comprising:
a rotational mechanism portion to enable a seat back to at least rotate rearward around a lower end thereof from a specified standard position thereof;
a tilt mechanism portion to enable a front portion of a seat cushion to at least move substantially vertically; and
a linkage mechanism portion to make the tilt mechanism portion move the front portion of the seat cushion substantially vertically in accordance with a rotation of the seat back enabled by the rotational mechanism portion,
wherein said tilt mechanism portion is configured such that a vertical moving distance of the front portion of the seat cushion is greater than a longitudinal moving distance thereof when the front portion of the seat cushion moves between a lowermost position and an uppermost position thereof,
wherein said linkage mechanism portion comprises at least one link that moves substantially longitudinally in accordance with the rotation of the seat back, and said tilt mechanism portion comprises a rotating lever that is attached at a portion on a fixed side so as to rotate around a rotational axis extending substantially laterally, one end of the rotating lever being rotatably coupled to a member on a side of the seat cushion, the other end of the rotating lever being rotatably coupled to a front end of said one link of the linkage mechanism portion,
wherein a rear portion of the seat cushion is attached at a portion on a fixed side so as to rotate around an axis extending substantially laterally,
wherein the other end of the rotating lever is located above said rotational axis, and said linkage mechanism portion is configured in such a manner that the other end of the rotating lever is pulled rearward in accordance with the rearward rotation of the seat back.

10. A seat device, comprising:
a rotational mechanism portion to enable a seat back to at least rotate rearward around a lower end thereof from a specified standard position thereof;
a tilt mechanism portion to enable a front portion of a seat cushion to at least move substantially vertically; and
a linkage mechanism portion to make the tilt mechanism portion move the front portion of the seat cushion substantially vertically in accordance with a rotation of the seat back enabled by the rotational mechanism portion,
wherein said tilt mechanism portion is configured such that a vertical moving distance of the front portion of the seat cushion is greater than a longitudinal moving distance thereof when the front portion of the seat cushion moves between a lowermost position and an uppermost position thereof,
wherein said rotational mechanism portion is configured to enable the seat back to rotate forward to a position in which a back face of the seat back is located substantially horizontally, said linkage mechanism portion comprises at least one link that moves either forward or rearward in accordance with a forward rotation of the seat back, and said tilt mechanism portion is configured such that the front portion of the seat cushion lowers in accordance with said movement of the link.

11. The seat device of claim 10, wherein said link of the linkage mechanism portion is respectively connected to a portion on a side of the seat back and a portion on a side of the tilt mechanism portion via slots in such a manner that the seat cushion moved by the tilt mechanism portion rotates forward by a specified second angle while the seat back rotates forward from the specified standard position by a specified first angle, the specified second angle being smaller than the specified first angle.

12. A seat device, comprising:
a rotational mechanism portion to enable a seat back to at least rotate rearward around a lower end thereof from a specified standard position thereof;
a tilt mechanism portion to enable a front portion of a seat cushion to at least move substantially vertically; and
a linkage mechanism portion to make the tilt mechanism portion move the front portion of the seat cushion substantially vertically in accordance with a rotation of the seat back enabled by the rotational mechanism portion,
wherein said tilt mechanism portion is configured such that a vertical moving distance of the front portion of the seat cushion is greater than a longitudinal moving distance thereof when the front portion of the seat cushion moves between a lowermost position and an uppermost position thereof,
wherein said linkage mechanism portion comprises at least one link, and at the link is provided a slot operative to restrain conveyance of a rotational movement of the seat back to said tilt mechanism portion when the seat back is positioned within a specified rotational range,
wherein the link is supported via the slot at a supporting axis provided at a portion on a fixed side on a side of the seat back in such a manner that a major movement pattern of the link is changeable from either one of a rotation thereof around the supporting axis and a slide thereof guided by the supporting axis to the other when a rotational position of the seat back changes.

13. The seat device of claim 12, wherein said linkage mechanism portion comprises a first link provided on the side of the seat back and a second link provided on a side of the tilt mechanism portion, the first link is supported via the slot at the supporting axis provided at the portion on the fixed side on the side of the seat back in such a manner that the first link provides the major movement of the rotation thereof around the supporting axis when the rotational position of the seat back is located between the specified standard position and a specified position that is rearward from the specified standard position by a specified angle, while the first link provides the major movement of the slide thereof guided by the supporting axis when the seat back is rotated rearward beyond said specified position that is rearward from the specified standard position by the specified angle, the second link is coupled to the first link in such a manner that a connecting portion thereof to the tilt mechanism portion moves in accordance with the rotation of the first link, while the second link rotates around said connecting portion to the tilt mechanism portion in accordance with the slide movement of the first link.

14. A seat device, comprising:
a rotational mechanism portion to enable a seat back to at least rotate rearward around a lower end thereof from a specified standard position thereof;
a tilt mechanism portion to enable a front portion of a seat cushion to at least move substantially vertically; and
a linkage mechanism portion to make the tilt mechanism portion move the front portion of the seat cushion substantially vertically in accordance with a rotation of the seat back enabled by the rotational mechanism portion,
wherein said tilt mechanism portion is configured such that a vertical moving distance of the front portion of the seat cushion is greater than a longitudinal moving distance thereof when the front portion of the seat cushion moves between a lowermost position and an uppermost position thereof,
wherein said linkage mechanism portion comprises at least one link, and at the link is provided a slot operative to restrain conveyance of a rotational movement of the seat back to said tilt mechanism portion when the seat back is rotated rearward beyond a specified position that is rearward from the specified standard position by a specified angle, and there is provided a resistance-force adding device to apply a resistance force to a rearward rotation of the seat back beyond said specified position,
wherein said slot is provided at at least one of a connecting portion of the link on a side of the seat back and a connecting portion of the link on a side of the tilt mechanism portion,
wherein the link is supported via the slot at a supporting axis provided at a portion on a fixed side on a side of the seat back in such a manner that a major movement pattern of the link is changeable from either one of a rotation thereof around the supporting axis and a slide thereof guided by the supporting axis to the other during the rotation of the seat back.

15. The seat device of claim 14, wherein said linkage mechanism portion comprises a first link provided on the side of the seat back and a second link provided on a side of the tilt mechanism portion, the first link is supported via the slot at the supporting axis provided at the portion on the fixed side on the side of the seat back in such a manner that the first link provides the major movement of the rotation thereof around the supporting axis when the rotational position of the seat back is located between the specified standard position and a specified position that is rearward from the specified standard position by a specified angle, while the first link provides the major movement of the slide thereof guided by the supporting axis when the seat back is rotated rearward beyond said specified position that is rearward from the specified standard position by the specified angle, the second link is coupled to the first link in such a manner that a connecting portion thereof to the tilt mechanism portion moves in accordance with the rotation of the first link, while the second link rotates around said connecting portion to the tilt mechanism portion in accordance with the slide movement of the first link.

* * * * *